United States Patent
Kusuda et al.

(10) Patent No.: US 6,644,866 B1
(45) Date of Patent: Nov. 11, 2003

(54) ELECTRONIC APPARATUS

(75) Inventors: Kiyonori Kusuda, Kawasaki (JP); Kenji Tsutsumi, Kawasaki (JP); Hiroshi Kadoya, Kawasaki (JP); Kenji Toshimitsu, Kawasaki (JP); Kazuo Fujita, Osaka (JP); Hiroshi Katou, Osaka (JP); Mitsuaki Hayashi, Osaka (JP); Koichi Nakamura, Osaka (JP); Hironori Tanaka, Osaka (JP); Akira Sawada, Osaka (JP); Kazuya Nishida, Osaka (JP); Hideki Zenitani, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/386,317

(22) Filed: Aug. 31, 1999

(30) Foreign Application Priority Data

Sep. 1, 1998 (JP) .......................................... 10-247384
Jul. 21, 1999 (JP) .......................................... 11-206820

(51) Int. Cl.[7] ................................................ G02B 6/36
(52) U.S. Cl. .............................. 385/88; 385/53; 385/89; 385/136; 385/137
(58) Field of Search ................................ 385/45, 60, 69, 385/76, 77, 86, 136, 134, 135, 88, 89, 53, 55, 56, 137

(56) References Cited

U.S. PATENT DOCUMENTS

| 5,530,787 | A | * | 6/1996 | Arnett | 385/137 |
| 5,659,650 | A | * | 8/1997 | Arnett | 385/135 |
| 5,781,678 | A | * | 7/1998 | Sano et al. | 385/45 |

FOREIGN PATENT DOCUMENTS

JP  6-337317  12/1994

* cited by examiner

Primary Examiner—Frank G. Font
Assistant Examiner—Michael P Mooney
(74) Attorney, Agent, or Firm—Staas & Halsey LLP

(57) ABSTRACT

An electronic apparatus includes an optical connector adapting unit to which optical connectors of external optical fibers are connected. The optical connector adapting unit includes a plurality of optical connector adapters which are diagonally arranged on the front side of the apparatus. The optical connectors of the external optical fibers are diagonally detachable from the optical connector adapters. In this electronic apparatus, a large number of optical connectors of optical fibers can be connected and arranged in a restricted space.

16 Claims, 37 Drawing Sheets

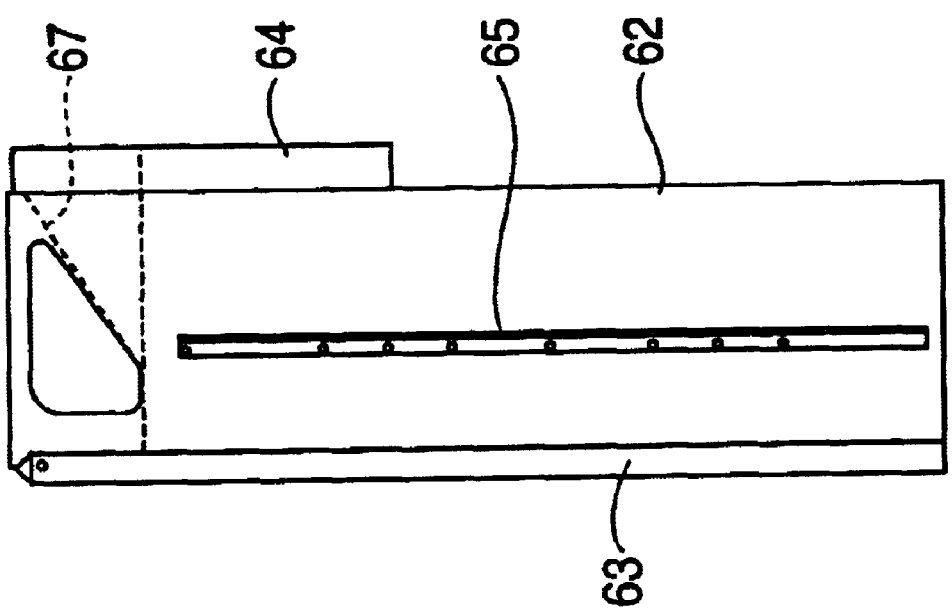
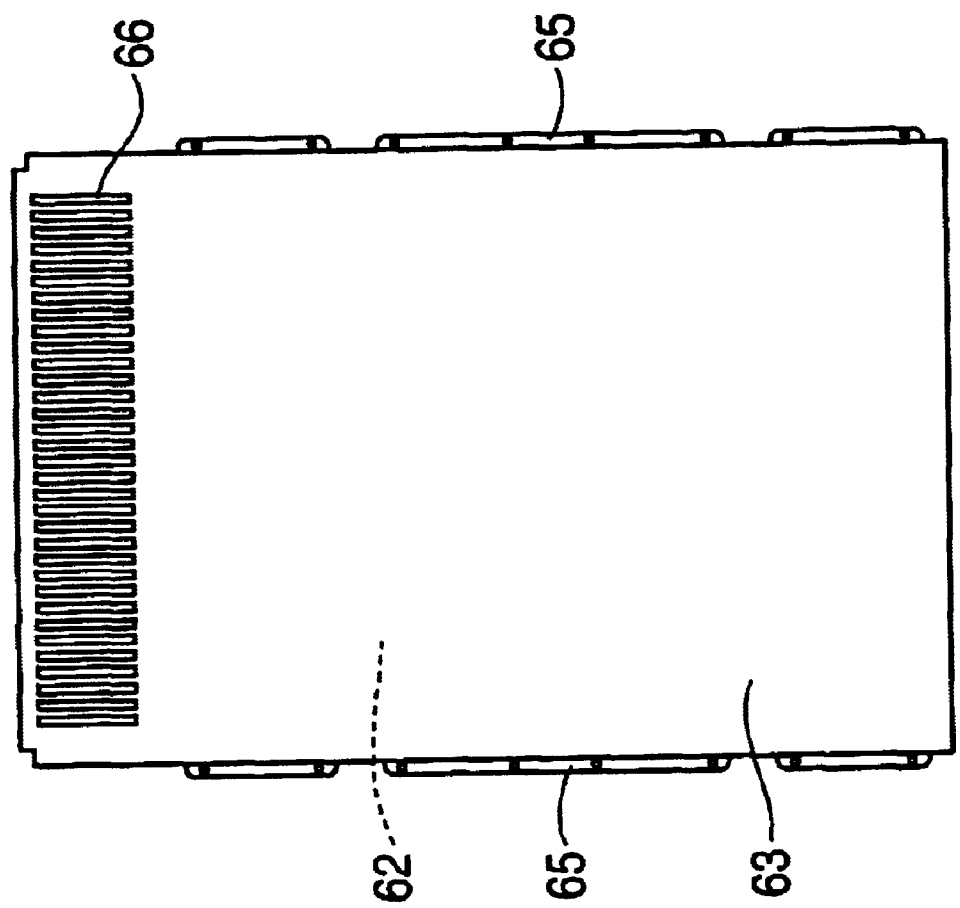

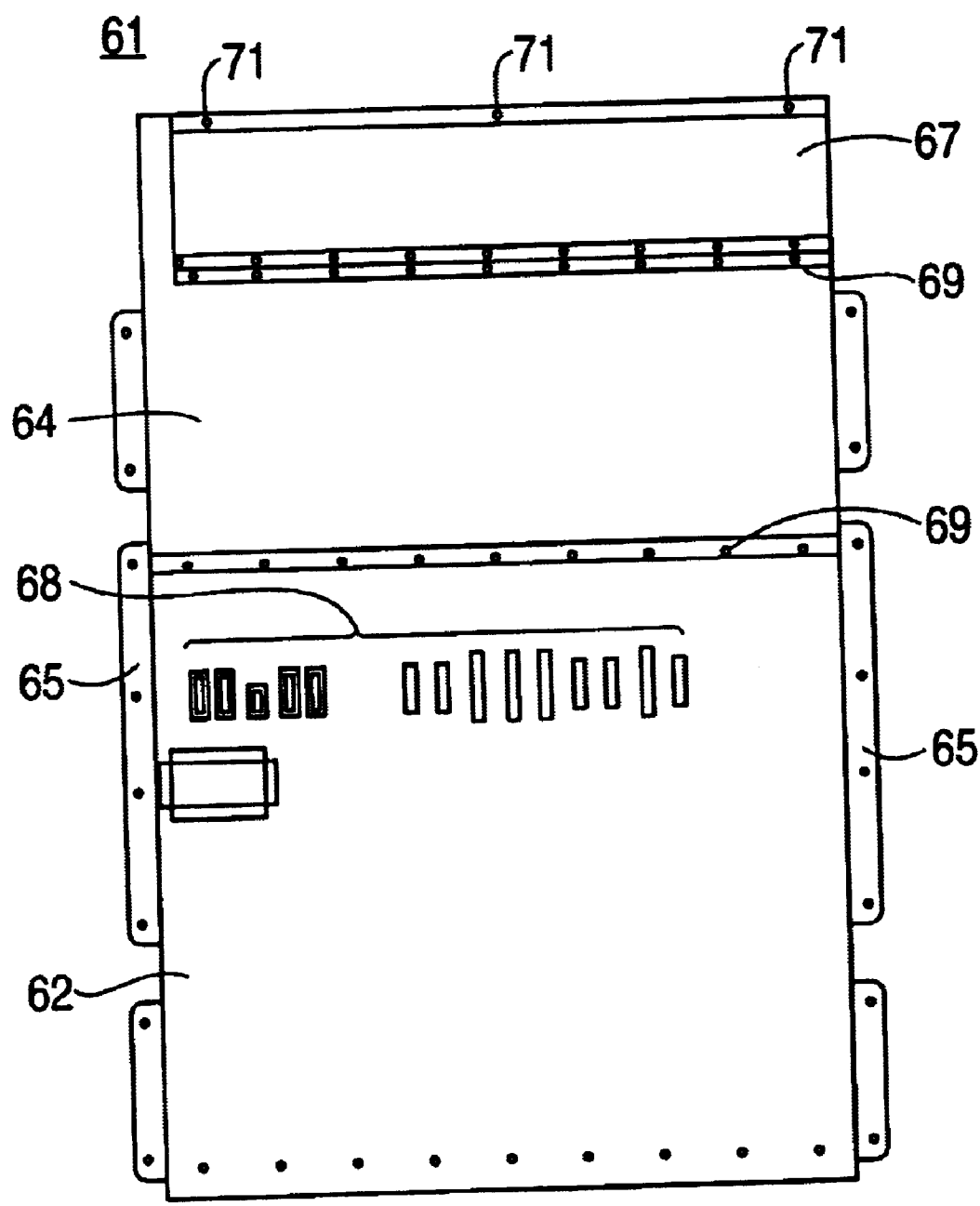

ELECTRONIC APPARATUS

BACKGROUND OF THE INVENTION

1. Field of the Invention

The present invention generally relates to electronic apparatuses which employ optical fibers as optical signal transmission paths and carry out information processing and communication of various types.

2. Description of the Related Art

As the amount of data transmission has dramatically increased due to the spread of the Internet and other communication devices, there has been a demand for optical multiplexing communication apparatuses having a larger capacity for data transmission. Therefore, it is necessary to develop a high performance apparatus having a high density and capable of transmitting a large amount of information at a high speed.

In response to this demand, multiplexing apparatuses employing a TDM (Time division Multiplexing) system have been developed. In the TDM system, electrical signals are multiplexed on the time base. However, super high-speed signals, such as 10 Gb/s signals, have very short time intervals between signals, and the TDM system has almost reached the limit of today's signal transmission technique in terms of speed.

Meanwhile, in a communication system which employs optical fibers as signal transmission paths, super high-speed signals, such as 10 Gb/s signals, cannot be transmitted through conventional 1.3 μm optical fibers over a long distance, due to the optical wavelength dispersion. This problem can be solved by using high performance optical fibers, such as 1.55 μm DSFs (Dispersion Shifted Fibers), for restricting wavelength dispersion. However, a large expense is required for laying such optical fibers.

In view of these facts, apparatuses which employ a WDM (Wavelength Division Multiplexing) system are becoming the mainstream to solve the above-mentioned problems and to achieve high-density and large-volume information transmission.

In the WDM system, optical signals are multiplexed on the optical wavelength axis. At present, 45 wavelengths is standardized by the ITU standards. Accordingly, at the rate of 10 Gb/s, a large volume (10 G×45=450 G) of information can be transmitted through one optical fiber. In the future optical multiplexing communication system, 45 waves can be handled both on the multiplexing side and the separation (or demultiplexing) side. Therefore, as many as 90 optical fibers may be employed in one system. This trend toward a larger number of optical fibers is continuing.

An optical multiplexing communication apparatus basically has a transmitting side (multiplexing side) and a receiving side (separation side). The transmitting side comprises a transmitting unit (OS), an ATT unit, and an optical MUX. The ATT unit adjusts and optimizes the levels of optical signals from the OS. The optical MUX then multiplexes optical signals having different optical wavelengths λ1 to λn, and then transmits the multiplexed optical signals. When transmitting optical signals over a long distance, an optical AMP unit is employed, where necessary, to directly amplify the optical signals.

The receiving side comprises an optical DMUX unit, an ATT unit, and a receiving unit (OR). The optical DMUX unit separates the individual optical signals in accordance with the different optical wavelengths λ1 to λn. The ATT unit then adjusts and optimizes the level of each optical signal, and the OR outputs separated signals. On the receiving side, an optical AMP unit for directly amplifying received optical signals is also employed, where necessary.

Two optical fibers each provided with an optical connector can be detachably connected to each other. The two optical connectors are brought into contact facing each other, thereby optically connecting the corresponding optical fibers to each other.

FIG. 29A is a perspective view of a first example of an optical connector adapter. This optical connector adapter 1 has flanges 2 in the middle, and is attached to an L-shaped attachment metal fitting 3 with attaching screws 4. The attachment metal fitting 3 is secured to desired positions on the apparatus.

Optical connectors are inserted into both ends of the optical connector adapter 1, and the ferrules of the optical connectors are pressed and optically coupled to each other inside a sleeve (not shown). SC-type optical connectors can be inserted into and connected to both ends of the optical connector adapter 1.

FIG. 29B is a perspective view of the optical connector adapter 1 with an SC-type optical connector 5-1 inserted into one end and another SC-type optical connector 5-2 which is yet to be inserted into the other end. A single-core optical fiber 6 is introduced into each of the optical connectors 5-1 and 5-2. When inserted, the SC-type optical connectors 5-1 and 5-2 are locked to the optical connector adapter 1 in an insertion position. The SC-type optical connectors 5-1 and 5-2 can easily be released from the optical connector adapter 1.

FIG. 30A is a perspective view of a second example of an optical connector adapter. This optical connector adapter 7 has flanges 8 in the middle, and is attached to the L-shaped attachment metal fitting 3 with the attaching screws 4. The attachment metal fitting 3 is secured to desired positions on the apparatus.

Optical connectors are inserted into both ends of the optical connector adapter 7, and the ferrules of the optical connectors are pressed and optically coupled to each other inside a sleeve (not shown). An SC-type optical connector can be inserted into and connected to one end of the optical connector adapter 7, and an FC-type optical connector can be inserted into and connected to the other end of the optical connector adapter 7.

FIG. 30B is a perspective view of the optical connector adapter 7 with an SC-type optical connector 5 inserted into one end and an FC-type optical connector 9 which is yet to be inserted into the other end. A single-core optical fiber 6 is introduced into each of the optical connectors 5 and 9. When inserted, the SC-type optical connector 5 is locked to the optical connector adapter 7 in an insertion position. The SC-type optical connector 5 can easily be released from the optical connector adapter 7. The FC-type optical connector 9 is attached to the optical connector adapter 7 by tightening a ring nut 12 to a screw 11 formed around the optical connector adapter 7, and is detached by loosening the ring nut 12.

FIG. 31A is a perspective view of a third example of an optical connector adapter. This optical connector adapter 14 has flanges 15 in the middle, and is attached to the L-shaped attachment metal fitting 3 with the attaching screws 4. The attachment metal fitting 3 is secured to desired positions on the apparatus.

Optical connectors are inserted into both ends of the optical connector adapter 14, and the ferrules of the optical connectors are pressed and optically coupled to each other inside a sleeve (not shown). An SC-type optical connector can be inserted into and connected to one end of the optical connector adapter 14, and an ST-type optical connector can be inserted into and connected to the other end of the optical connector adapter 14.

FIG. 31B is a perspective view of the optical connector adapter 14 with an SC-type optical connector 5 inserted into one end and an FC-type optical connector 16 which is yet to be inserted into the other end. A single-core optical fiber 6 is introduced into each of the optical connectors 5 and 16. When inserted, the SC-type optical connector 5 is locked to the optical connector adapter 14 in an insertion position. The SC-type optical connector 5 can easily be released from the optical connector adapter 14. The ST-type optical connector 16 is attached to the optical connector adapter 14 by rotatably covering a protrusion 17 on the optical connector adapter 14 with a ring 19 having a helix in a bayonet-like manner.

FIG. 32 is a perspective view of a conventional optical multiplexing communication apparatus. This optical multiplexing communication apparatus 21 is attached between a pair of support pillars 22, and has two printed board shelves 24 disposed one above the other. A number of printed board units 23 are inserted and plugged in the printed board shelves 24. The upper printed board shelf 24 is a multiplexing unit, while the lower printed board shelf 24 is a separation unit. Sixteen printed board units are inserted into each of the printed board shelves 24. The number of printed board shelves 24 can be increased if there is an increase in the number of communication lines.

In FIG. 32, the leftmost one of the printed board units 23 is pulled out of each of the printed shelves 24. The printed board units 23 are mounted with optical signal processing circuits, electric/optical signal conversion devices, optical/electrical conversion devices, and others, which are not shown in the figure to avoid unnecessary complexity.

It is necessary to connect external optical fibers 25 and internal optical fibers 6 to each of the printed board units 23, and therefore a plurality (four in FIG. 32) of optical connector adapters are attached to the front side of a surface of each printed board unit 23 with attachment metal fittings.

A guide board 26 for guiding air upward from the front side to the rear side is disposed above each of the printed board shelves 24. The guide board 26 is used to discharge the air heated by the circuit devices during an operation. The lower surface of the guide board 26 guides and discharges the heated air to the rear side, and the upper surface guides and sucks in cool air from the outside. The inclination of the guide board 26 also forms a space between the bottom surface of the upper printed board shelf 24 and the top surface of the lower printed board shelf 24.

The air ventilation can be selectively carried out by natural convention depending on temperature variations or by an electric fan (not shown) disposed on or under the printed board shelves 24. The optical fibers 25, including the optical fibers between the printed board units 23, the optical fibers between the printed board shelves 24, the optical fibers connected to external lines, are all introduced to the front side via the rear side and upper side of each of the guide boards 26, as shown in FIG. 32.

Since each of the optical fibers 25 requires some extra length depending on the intended use of demand, the extra length 27 is wound and disposed on the guide board 26. A positioning member (not shown) secures the extra length 27 of each optical fiber 25 to maintain an orderly state.

Each of the printed board units 23 is provided with the same number of optical connector adapters 1, as well as the circuits corresponding to the number of lines required. The optical connectors of the external optical fibers 25 can be attached to and detached from the optical connector adapters 1 according to changes in the number of lines.

When attaching or detaching the optical connectors, it is necessary to pull out the printed board units 23 and put them back to their original positions, as shown in FIG. 32.

FIG. 33 is a sectional side view of the optical multiplexing communication apparatus 21. In this figure, the printed board units 23 are inserted into the printed board shelf 24, and the internal optical fibers and their optical connectors are not shown for ease of explanation. Only the optical connectors 28 of the external optical fibers 25 are shown connected to the optical connector adapters 1.

Guide portions (not shown) for guiding the printed board units 23 forward and backward, and air holes (not shown) for moving air in the vertical direction are formed on the upper and lower surfaces of the printed board shelf 24. In FIG. 33, the left side is the front side of the apparatus 21, and the right side is the rear side of the apparatus 21. A backboard 31 that is a printed board provided with backboard connectors 32 is attached to the rear side of the printed board shelf 24.

Each of the printed board units 23 has a front plate 35 on the front side, insertion members 36 at the top and bottom on the front side, a stopper 37 at the bottom halfway to the rear side, and a printed board unit connector 38 on the rear side. When the printed board units 23 are inserted into the printed board shelf 24, the printed board unit connectors 38 are plugged in the backboard connectors 32.

On the upper surface of the guide board 26, the extra lengths 27 of the external optical fibers 25 are wound and placed from the rear side to the front side. The external optical fibers 25 are then introduced into the printed board units 23 on the front side, and are bundled by bundling bands 39 which are secured to the front sides of the printed board units 23.

In FIG. 33, four external optical fibers 25 are connected to the optical connector adapters 1, but if the number of lines increases or decreases or the lines are changed, it is necessary to attach more of the optical connectors 28 to the optical connector adapters 1, or to detach some of the optical connectors 28 from the optical connector adapters 1.

The attachment and detachment of the optical connectors 28 are carried out by manipulating the insertion members 36, as shown in FIG. 34. Here, the stopper 37 of each of the printed board units 23 is stopped by a metal fitting on the front side of the printed board shelf 24, and the backboard connector 32 and the printed board unit connector 38 become electrically disconnected. The wound extra lengths 27 are stretched at the same time, and the bundling bands 39 are detached or reattached.

However, the above procedures cause inconvenience, because all the operations have to stop for the attachment and detachment of the connectors. To solve this problem, flexible portions 43 are formed diagonally to the front plate 42 of a printed board unit 41, as shown in FIG. 35. The optical connector adapters 1 are directly attached to the flexible portions 43, and the internally connected optical connectors 5 are also connected to the flexible portions 43.

By connecting and detaching a desired external optical connector 28 as shown in FIG. 35 depending on a increase or decrease of the number of lines, the necessary procedures can be carried out without pulling the printed board unit 41 out of the printed board shelf, without stopping the operations of the circuits, and without pulling the extra lengths 27 of the optical fibers 25.

The flexible portions 43 are formed in the middle of the front plate 42 and the optical connector adapters 1 are attached to the flexible portions 43. With this configuration, spaces required for the optical connectors protruding from the front side or for the bent portions of the optical fibers can be greatly reduced.

As shown in FIG. 35, a larger number of optical connector adapters 1 result in compressing the circuit mounting area of the printed board unit 41 due to the flexible portions 43 of the front plate 42 lined in the depth direction.

To avoid such a problem, another type of optical multiplexing communication apparatus shown in FIG. 36 has been developed. In this figure, only two printed board units 45 in different positions are shown, but it should be understood that there are some others inserted into the printed board shelf.

The printed board unit 45 on the right side in the figure is denoted by 45-1, the other one on the left side is denoted by 45-2. The printed board unit 45-1 is inserted into the printed board shelf, so that the printed board unit connector 38 is insert-connected to the backboard connector 32.

Each of the printed board units 45-1 and 45-2 is made up of a main printed board 46 and a sub printed board placed in parallel with the main printed board 46. The sub printed board 47 is rotatably supported by a shaft (not shown) at the upper corner on the front side. On the rear side, a guide member 48 is provided to the main printed board 46, and the rim of the rear side of the sub printed board 47 is engaged with the guide portion 48. An arcuate guide 49 (indicated by broken lines) formed with the rotation shaft as its center is disposed below the sub printed board 47. The rotation of the arcuate guide 49 is restricted so that the sub printed board 47 is not completely separated from the main printed board 46.

A screw 52 is attached to a lower portion of the front plate of each sub printed board 47, and secures the sub printed board 47 to the front plate of the main printed board 46, as indicated by the printed board unit 45-1 in FIG. 36. By loosening the screw 52, the sub printed board 47 can be pulled around at a rotation angle θ to the position indicated by 45-2. To allow such rotational movement, each main printed board 46 and sub printed board 47 are connected by a flexible flat cable 53 having a sufficient length.

An optical circuit device 55 is mounted on each sub printed board 47, and the external optical fibers 25 to be connected to the optical circuit device 55 are introduced from the upper rear side of the printed board shelf 24 to the upper front side, with the extra length 27 being disposed on the guide board 26.

The optical connector adapters 1 are attached to the attachment metal fittings 3 arranged on the sub printed board 47, and the internal optical fibers 6 are connected to the external optical fibers 25 via the optical connector adapters 1.

By rotatively moving the sub printed board 47 to the position indicated by 45-2, attachment and detachment of the optical connectors 28 of the external optical fibers 25 can be carried out without pulling the printed board unit 45 out of the printed board shelf 24. Thus, increasing and reducing the number of lines can be carried out, with the backboard connectors 32 remaining electrically connected to the printed board units 45.

FIG. 37 shows yet another type of optical multiplexing communication apparatus of the prior art. In order to allow more optical fibers 25 to printed board units 57, optical connector adapters 58 that are small in size are provided. Mu-type optical connectors can be connected to both ends of each of the optical connector adapters 58, so that high-density connection can be achieved.

With this structure, a large number of lines can be connected to one printed board unit 57 at once. However, to avoid bundled optical fibers 25 protruding from the front plate, it is necessary to form a notch 59 in the upper portion of the printed board shelf 24.

The above examples of optical multiplexing communication apparatus of the prior art have the following problems.

In the structure shown in FIGS. 32 to 34, when the optical connectors 28 of external optical fibers are attached or detached, the printed board units 23 are always electrically disconnected from the backboard 31. If a large number of optical connector adapters 1 are employed to increase the number of lines to be introduced into each printed board unit 23, the optical connector adapters 1 occupy a large area, taking up the space of the circuits. If the optical connector adapters 1 are arranged in the thickness direction, attachment and detachment of the optical connectors 28 become difficult, and each printed board unit 23 becomes thicker. Therefore, the number of lines to be introduced is limited. Also, it is necessary to have the extra length 27 for each optical fiber 25 to be introduced. The extra length 27 needs to be stretched when the printed board unit 23 is pulled out, and needs to be returned to its original position when the printed board unit 23 is inserted back into the printed board shelf 24. Furthermore, the extra length 27 is disposed on the guide board 26, and therefore the process needs to be carried out in the restricted space between two printed board shelves 24. This makes the whole procedures even more troublesome.

In the structure shown in FIG. 35, the number of flexible portions 43 becomes limited, because a large space is required for disposing the flexible portions 43 in the depth direction. Arranging the optical connector adapters 1 horizontally in line on the front side is problematic, considering the difficulty in attaching and detaching the optical connectors 28 and the thickness of each printed board unit 41. The problem of the extra portion 27 of each optical fiber 25 also remains unsolved in this structure.

In the structure shown in FIG. 36, each of the printed board units 45 consists of the main printed board 46 and the sub printed board 47, resulting in a large thickness. Rotating the sub printed board 47 is also a complicated procedure. To employ a large number of optical connector adapters 1 requires a large area on each sub printed board 47. Therefore, the number of optical connector adapters 1 still becomes limited, and it is not easy to attach and detach the optical connectors 28. The problem of the extra length 27 of each optical fiber 25 also remains unsolved in this structure.

In the structure shown in FIG. 37, it is possible to introduce a large number of optical fibers 25 into each printed board unit 57. However, attaching the optical connectors to the small, high-density optical connector adapters 58 requires special implements. Besides the problem of the extra length 27 of each optical fiber 25, the notch 59 formed for introducing the optical fibers 25 causes yet another problem. Since the optical fibers 25 are not made of a conductive material, the notch 59 is deemed as a space from an electric point of view. Electromagnetic waves having a wavelength corresponding to the size of the space can pass through the space, thereby causing electromagnetic interference to internal and external circuits.

SUMMARY OF THE INVENTION

A general object of the present invention is to provide an electronic apparatus in which the above disadvantages are eliminated.

A more specific object of the present invention is to provide an electronic apparatus in which a large number of optical connectors of optical fibers are connected and arranged neatly in a small space. Also, attaching and detaching external optical connectors can be easily carried out in this apparatus.

The above objects of the present invention are achieved by an electronic apparatus which comprises an optical connector adapting unit including a plurality of optical connector adapters to which optical connectors of external optical fibers are connected. The optical connector adapters are diagonally arranged on the front side of the apparatus. The optical connectors can be attached to and detached from the optical connector adapters in the diagonal direction on the front side of the apparatus.

Since the optical connector adapters are disposed diagonally from the front surface of the apparatus, the depth of the space occupied by the optical connector adapting unit can be made shorter than that in the prior art. Thus, the total area occupied by the apparatus can be made smaller.

By diagonally arranging the optical connector adapters, all the optical connector adapters can be seen in the front view. In such a configuration, all the optical connectors can be easily recognized, i.e., all the lines can be easily recognized. Thus, wrong connections can be effectively prevented.

The above and other objects and features of the present invention will become more apparent from the following description taken in conjunction with the accompanying drawings.

BRIEF DESCRIPTION OF THE DRAWINGS

FIGS. 1A and 1B are schematic views of one embodiment of an optical multiplexing communication apparatus of the present invention;

FIG. 2 is a rear view of the apparatus of FIG. 1;

DESCRIPTION OF THE PREFERRED EMBODIMENTS

Figure 3:
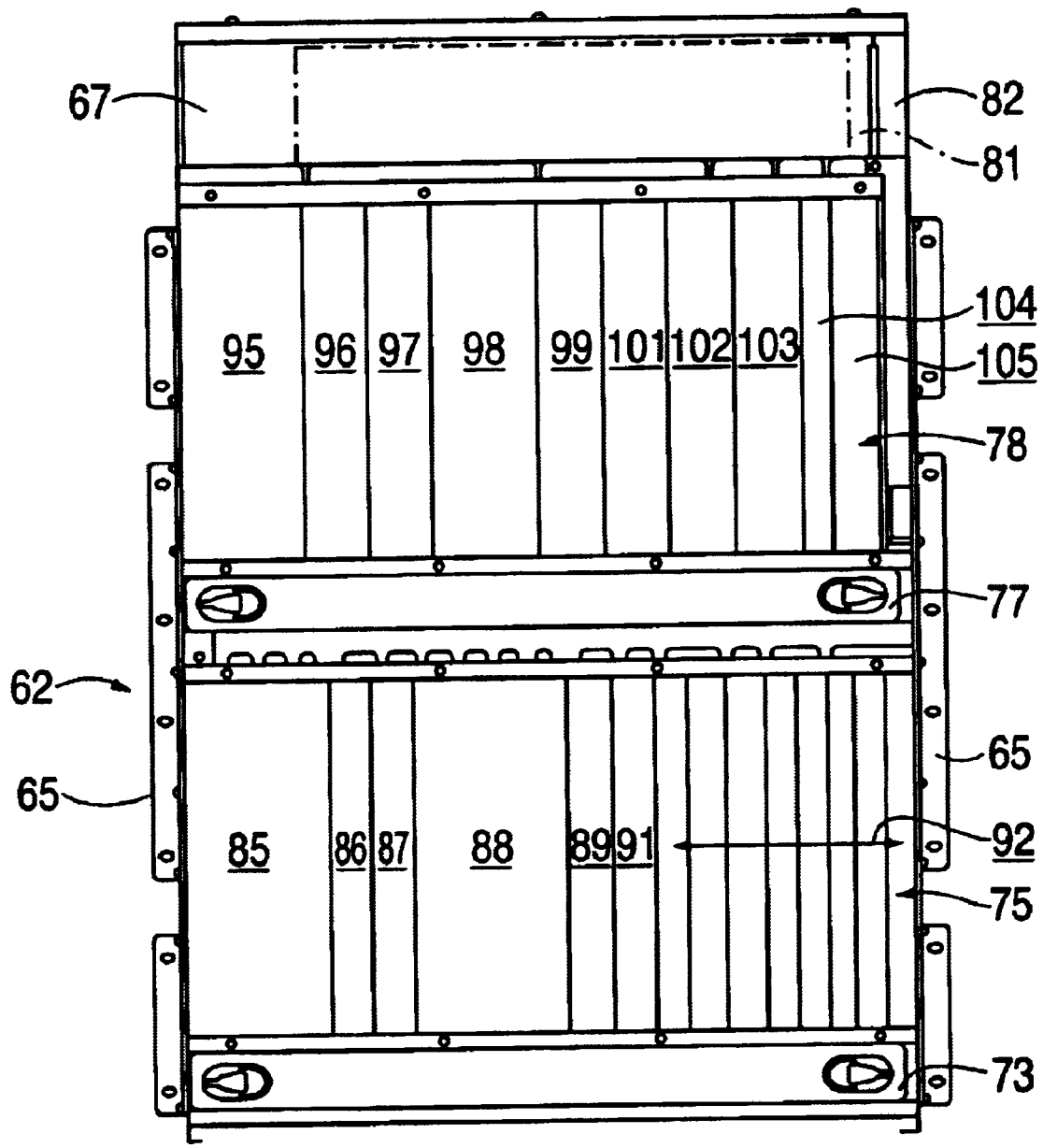
FIG. 3 is a front view of the apparatus of FIG. 1 without the front cover.

The following is a detailed description of preferred embodiments of an electronic apparatus of the present invention, with reference to the accompanying drawings. In all the drawings, like components are indicated by like reference numerals.

In the present invention, an optical fiber generally refers to an optical fiber cord having a single optical fiber core covered with a suitable material, an optical fiber cable having a plurality of optical fiber cores covered with a suitable material, and the like.

FIGS. 1A and 1B illustrate an embodiment of an optical multiplexing communication apparatus. In this embodiment, the present invention is applied to an electronic apparatus of the present invention. FIG. 1A is a front view of an optical multiplexing communication apparatus 61, and FIG. 1B is a side view of the same. The optical multiplexing communication apparatus 61 has a box-like housing formed from a folded metal plate, and circuits are housed inside the box-like housing.

The optical multiplexing communication apparatus 61 comprises a main housing 62, a front cover 63 which covers the front of the main housing 62, and an optical fiber cover 64 which covers the upper portion of the rear of the main housing 62. The main housing 62 is provided with L-shaped metal fittings 65 for attaching the optical multiplexing communication apparatus 61 to pillars of a cabinet (not shown) with screws. The metal fittings 65 protrude from both side surfaces. The front cover 63 is detachably attached to the main housing 62, and has air holes 66 in the upper portion. The optical fiber cover 64 is also detachable.

As shown in FIG. 1B, an air guide 67 which extends in the transverse direction in the front view is formed in the upper portion of the main housing 62. The air guide 67 is upwardly inclined toward the rear of the main housing 62, as indicated by a broken line. The region in the front portion partitioned by the air guide 67 is the region in which optical connector adapting units are disposed, and the region in the rear portion is an air discharging region through which air is discharged from the lower inside to the rear side.

FIG. 2 is a rear view of the optical multiplexing communication apparatus 61. A large number of electric connectors 68 of various kinds are disposed in the center of the main housing 62. Above the electric connectors 68, the optical fiber cover 64 is attached to the main housing 62 with attachment screws 69. The air guide 67 is attached to the uppermost portion of the main housing 62 with three screws 71. The optical fiber cover 64 extends to the side of the left end of the air discharging region. The length of the air guide 67 is equal to the distance from the right side of the main housing 62 to the extension portion of the optical fiber cover 64.

FIG. 3 is a front view of the optical multiplexing communication apparatus 61 without the front cover 63. The optical multiplexing communication apparatus 61 includes a first air blowing unit 73 formed by an electric air blower, a first printed board unit mounting region 75, a second air blowing unit 77, a second printed board unit mounting region 78, and an optical connector adapting unit 81 disposed in a region indicated by a two-dot chain line.

The air guide 67 can be seen behind the region in which the optical connector adapting unit 81 is disposed. At the right end of the region in FIG. 3, an optical fiber passage 82 which extends frontward and rearward is formed adjacent to the end of the air guide 67. The first and second air blowing units 73 and 77 blow air upward from the lower portion to forcibly send the cooling air into the printed board unit mounting regions 75 and 78.

A plurality of printed board units are plugged in the first and second printed board unit mounting regions 75 and 78. Each of the printed board units has a front plate on its front side, so that the entire front surface can be substantially flat.

The first printed board unit mounting region 75 is mounted with a received light amplifier 85, first and second received light boosters 86 and 87, a transmission light amplifier 88, first and second transmission light boosters 89 and 91, and controllers 92 for various functions.

The second printed board unit mounting region 78 is mounted with a light wavelength separating (demultiplexing) unit 95, first and second separated light wavelength level controllers 96 and 97, a light wavelength multiplexing unit 98, first and second multiplexed light wavelength level controllers 99 and 101, first and second spectrum analyzers 102 and 103, a controller 104, and an electric power source 105.

Figure 4:
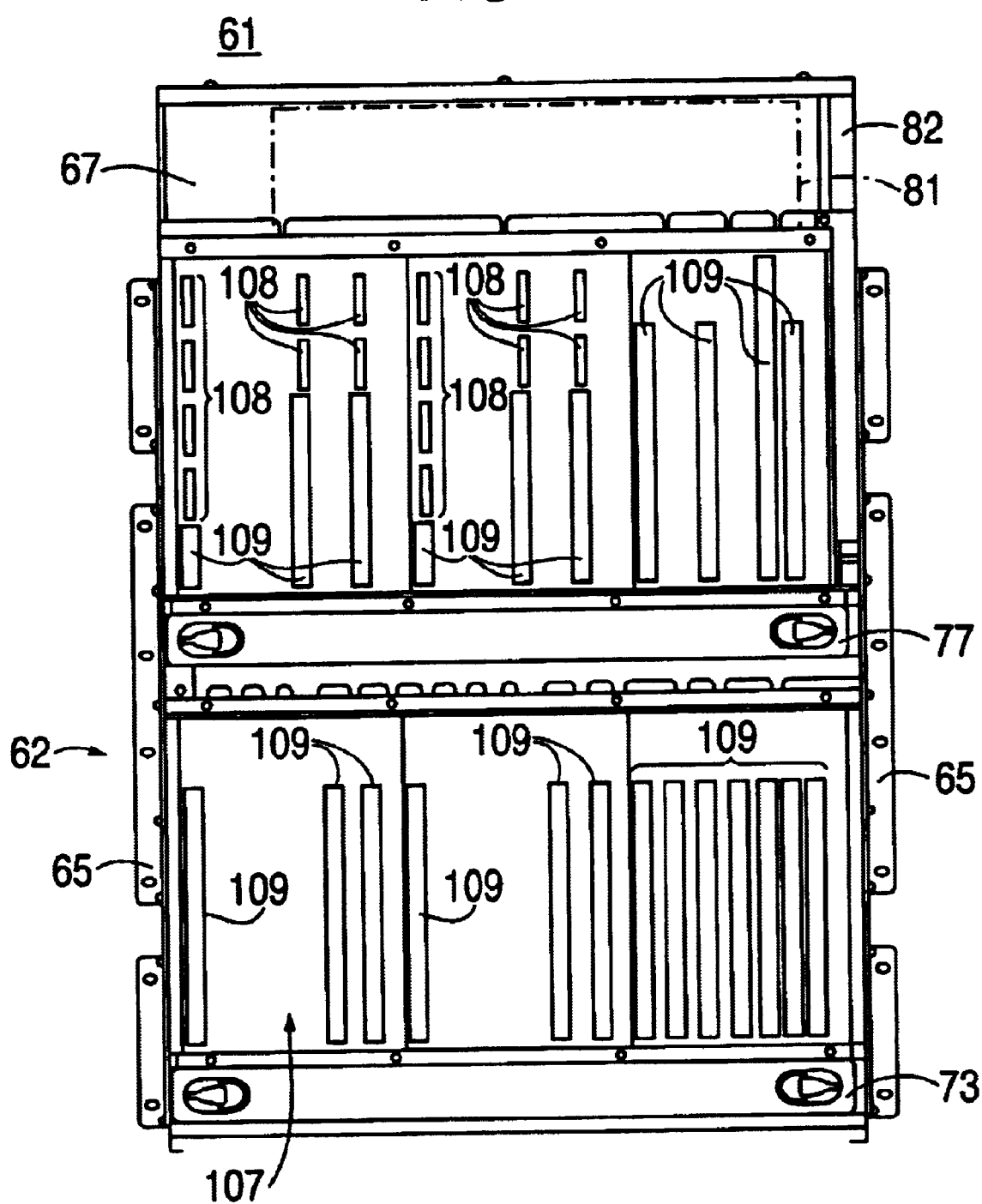
FIG. 4 is a front view of the apparatus of FIG. 3 without all the printed board units.

FIG. 4 shows the optical multiplexing communication apparatus 61 without the printed board units shown in FIG. 3. On a backboard 107 which is a printed board, backboard optical connectors 108 and backboard electric connectors 109 are arranged mounted in the positions corresponding to the respective printed board units. In FIG. 4, only some of the optical connectors 108 are shown, but the electric connectors 109 are only schematically shown to avoid unnecessary complexity in the drawing, because the electric connectors 109 are high-density multipolar connectors.

Figure 5:
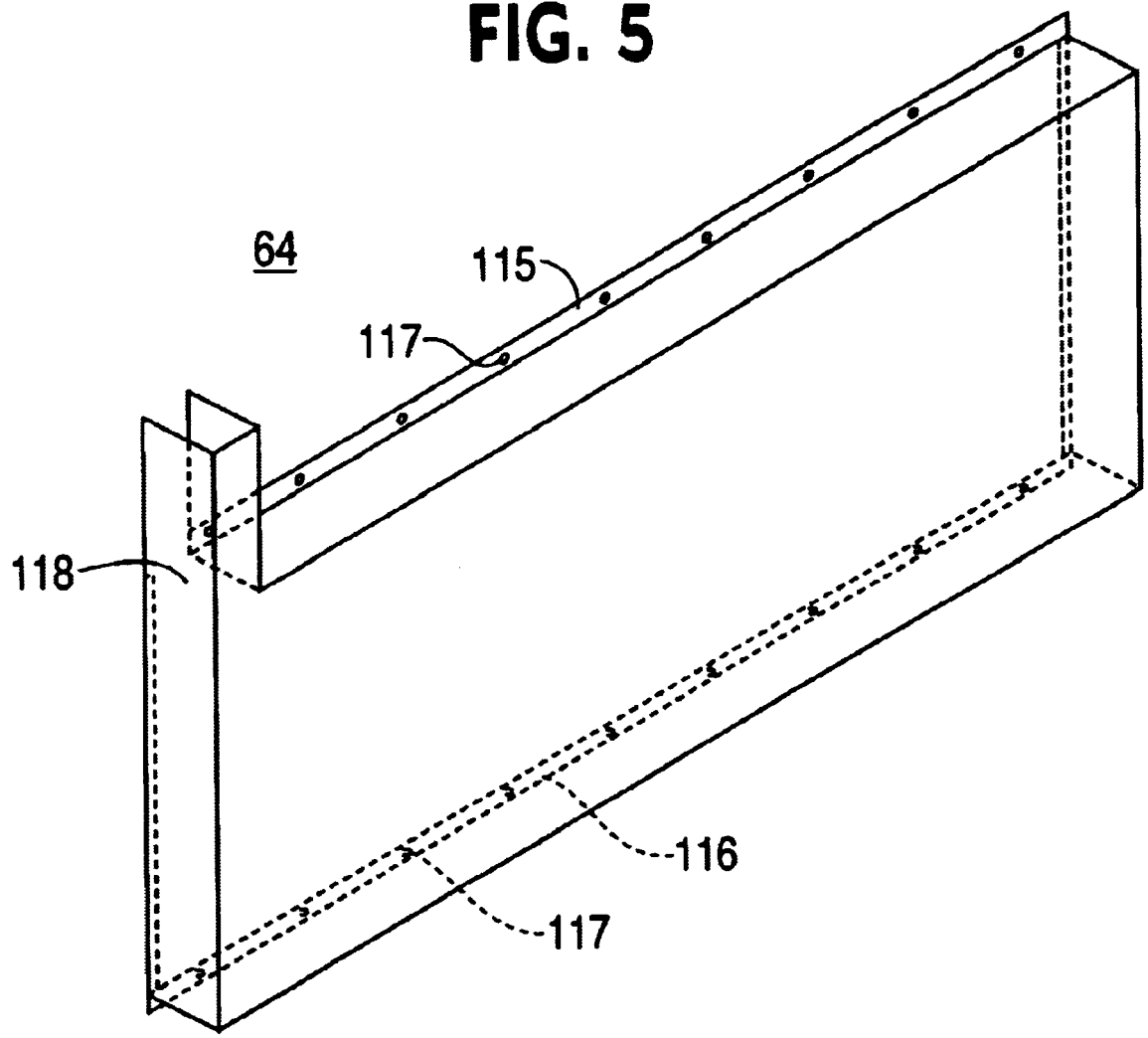
FIG. 5 is a perspective rear view of an optical fiber cover.

FIG. 5 is a perspective view of the optical fiber cover 64 attached to the rear of the optical multiplexing communication apparatus 61. The optical fiber cover 64 has a box-like shape with its front open. Screw insertion holes 117 are formed in upper and lower protruding rims 115 and 116, and an optical fiber inlet 118 which is open at the top and formed at the left edge of the optical fiber cover 64 shown in FIG. 5.

Figure 6:
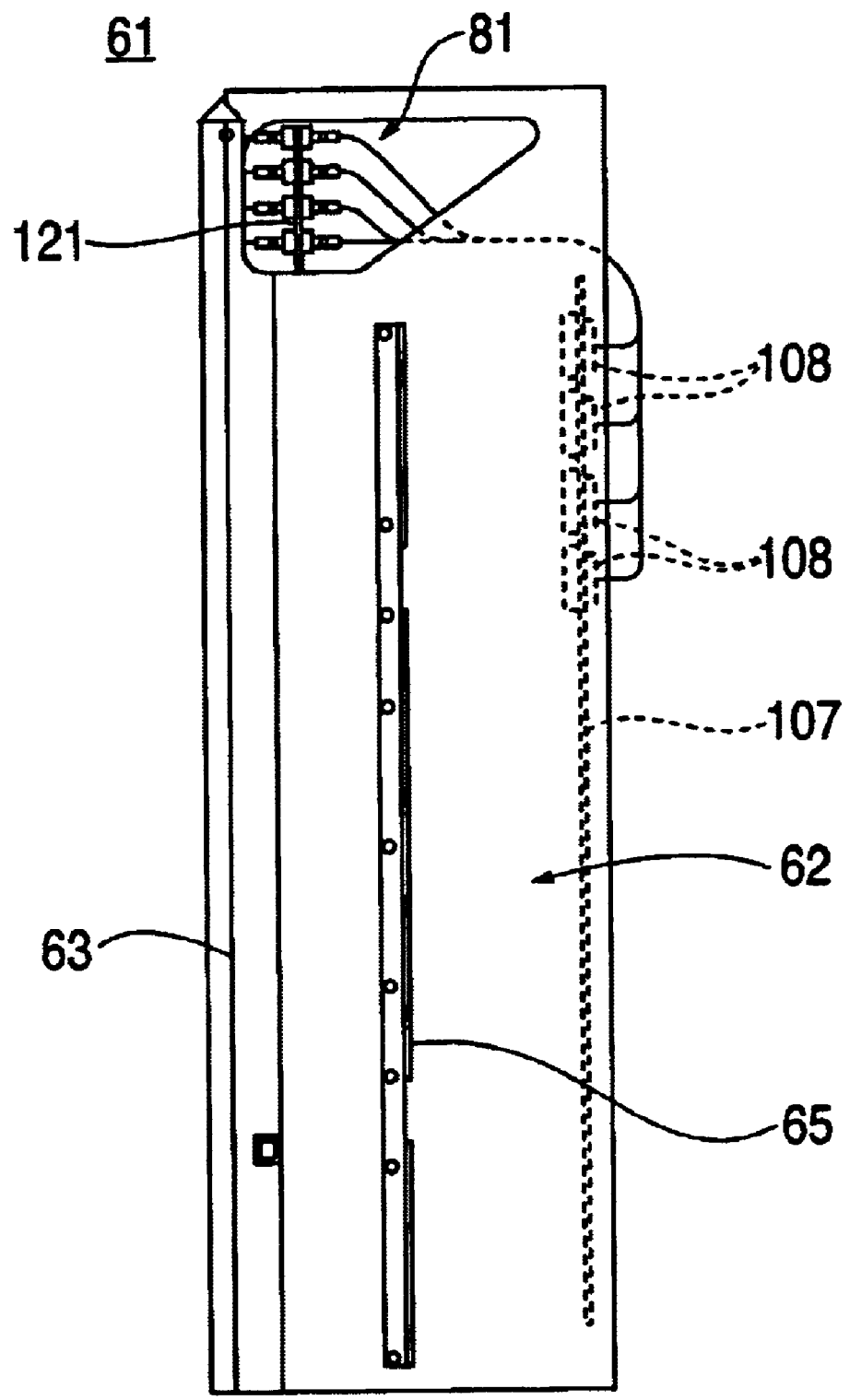
FIG. 6 is a side view of the apparatus of FIG. 1 without the optical fiber cover.

FIG. 6 is a side view of the optical multiplexing communication apparatus 61 without the optical fiber cover 64 on the rear surface. The backboard 107 and the backboard optical connectors 108 are indicated by broken lines. The optical connector adapting unit 81 in the uppermost portion is joined to an attachment metal fitting 121 which stands perpendicularly, and the optical connectors connected to the optical connector adapting unit 81 are seen through the hole on the sideboard of the optical multiplexing communication apparatus 61. The internal optical fibers extending from the optical connector adapting unit 81 are guided along the rear surface of the optical multiplexing communication apparatus 61, and are connected to the backboard optical connectors 108, respectively.

Figure 7:
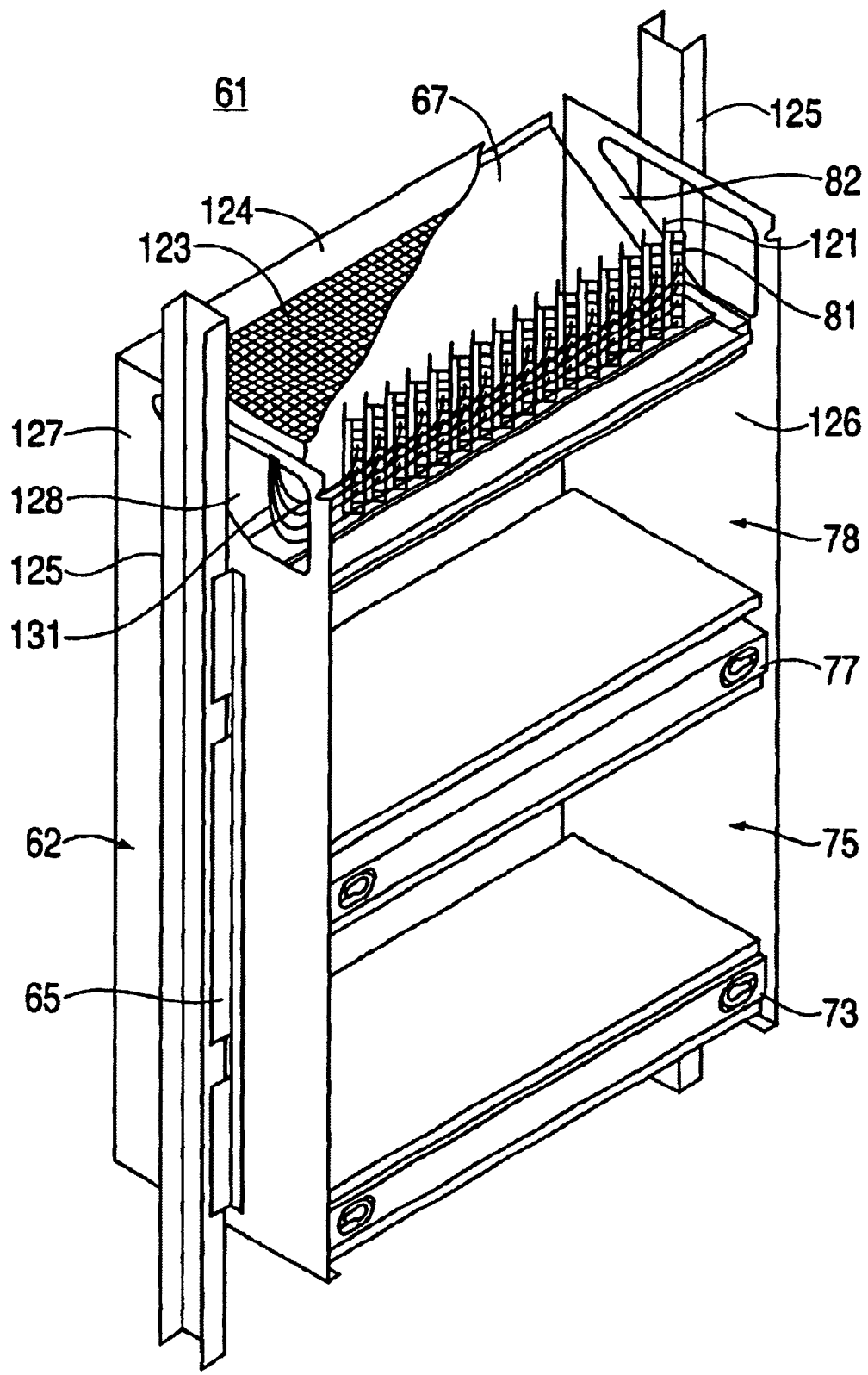
FIG. 7 is a perspective front view of the apparatus of FIG. 4.

FIG. 7 is a perspective view of the optical multiplexing communication apparatus 61 without the printed board units, with a top board 124 having a large number of air holes 123 being half removed. In this figure, the main housing 62 is attached to supporting pillars 125 of cabinets standing by both sides with the attachment metal fittings 65.

Although guide grooves for accommodating the printed board units and a large number of air holes are actually formed on the upper surface plates of the air blowing units 73 and 77, they are not shown in the figure to avoid complexity.

In the uppermost portion, the optical connector adapting unit 81 is arranged in the transverse direction on the front side. The air guide 67 and the optical fiber passage 82 adjacent to the right end of the air guide 67 and extending along a right sideboard 126 can be seen on the rear surface side.

A large number of external optical fibers 131 guided through an opening 128 of a left sideboard 127 are connected to the optical connector adapting unit 81 on the front side, and the internal optical fibers are connected to the optical connector adapting unit 81 on the rear side. This is shown in detail in the plan view of FIG. 8.

Figure 9:
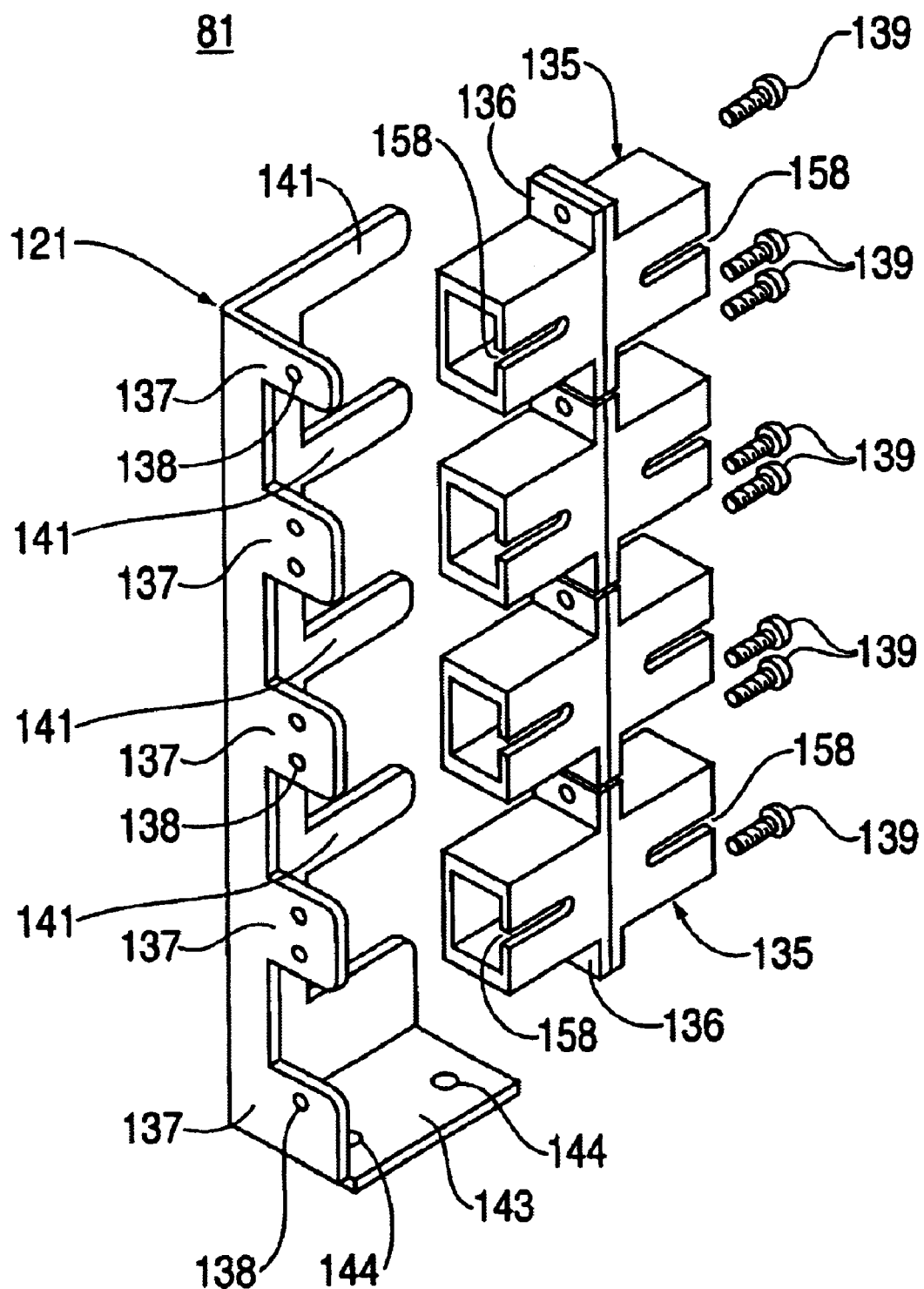
FIG. 9 is an exploded perspective view of the optical connector adapting unit.

Referring now to FIG. 9, the attachment metal fitting 121 is formed by stamping a metal plate. Optical connector adapters 135 are fitted to the attachment metal fitting 121, and flanges 136 of the optical connector adapters 135 are screwed into holes 138 of attachment surfaces 137 with screws 139.

Protrusions 141 protrude in parallel with each other and in the direction perpendicular to the attachment surfaces 137.

The protrusions 141 are used for indicating the line numbers or the optical connector numbers to be connected thereto.

Attachment screw insertion holes 144 are formed on a bottom surface 143 formed by perpendicularly bending the lower portion of the attachment metal fitting 121.

Figure 29B:
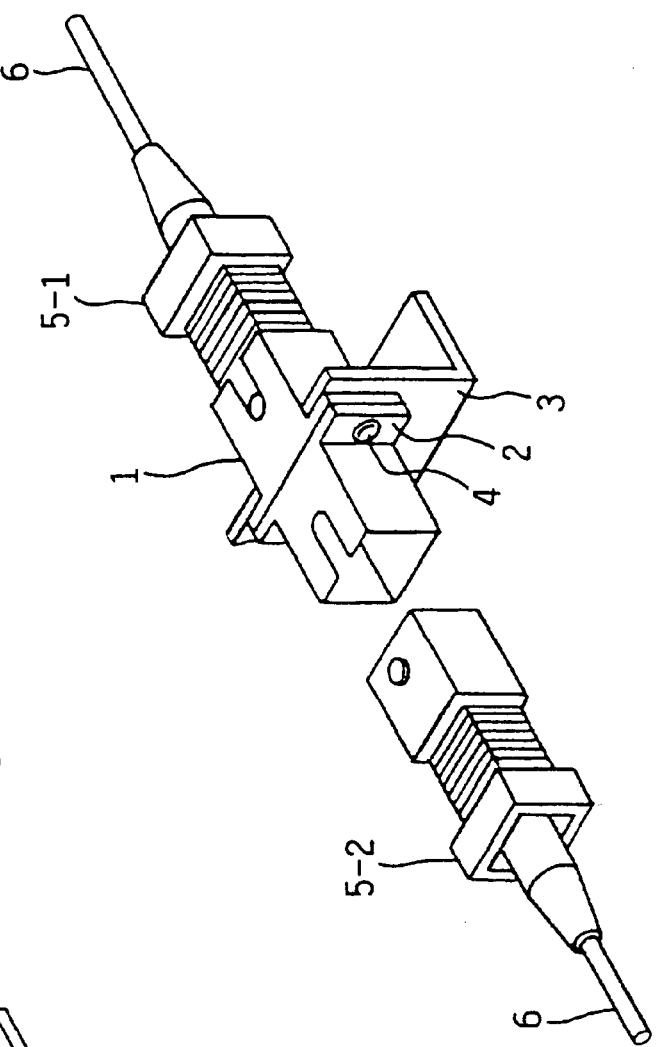
FIGS. 29A and 29B illustrate an optical connector adapting structure with an adapter.
Figure 29A:
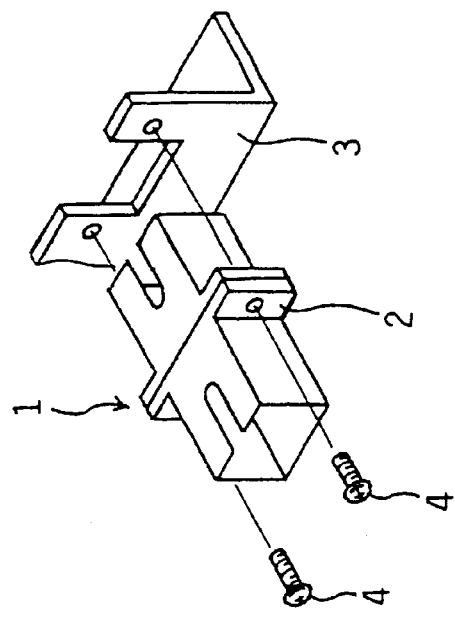

The structure of each of the optical connector adapters 135 is substantially the same as that of the first optical connector adapter 1 having SC-type optical connectors 5 inserted therein as shown in FIGS. 29A and 29B.

Figure 10:
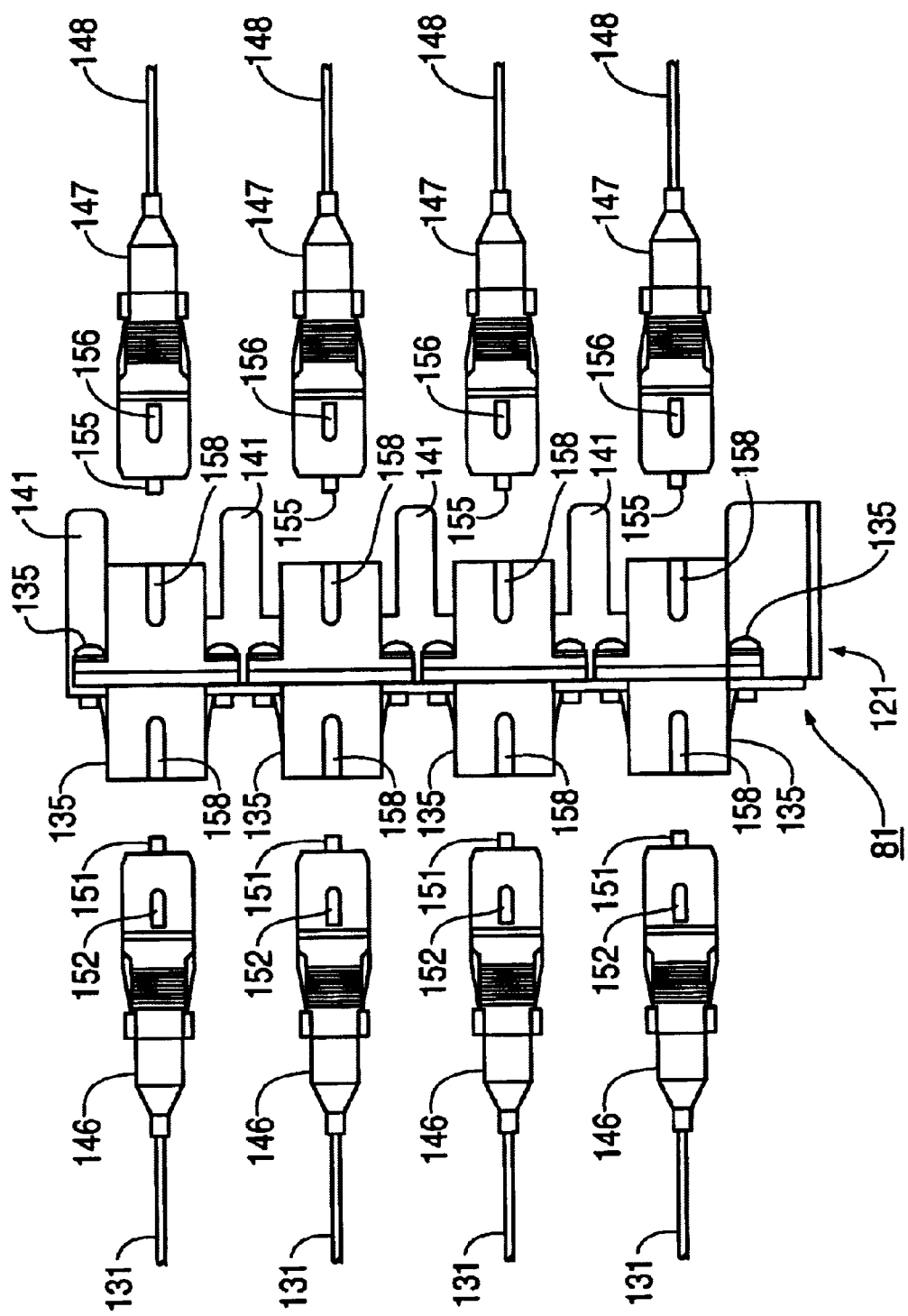
FIG. 10 illustrates the connection of the optical connectors to the optical connector adapting unit.

Referring now to FIG. 10, the optical connector adapters 135 are fixed to the attachment metal fitting 121 with the screws 139, thereby forming the optical connector adapting unit 81 of this embodiment. Optical connectors 146 and 147 having optical fibers connected thereto are inserted into both sides of each of the optical connector adapters 135. The optical fibers connected to the optical connectors 146 on the left side in FIG. 10 are the external optical fibers 131. The optical fibers connected to the optical connectors 147 on the right side in FIG. 10 are the internal optical fibers 148.

A ferrule 151 for holding and securing the optical fiber core of each optical fiber 131 in its center protrudes from the center of the top surface of each external optical connector 146, and a key 152 is formed on the outer surface of the housing of each external optical connector 146. Likewise, a ferrule 155 for holding and securing the optical fiber core of each optical fiber 148 in its center protrudes from the center of the top surface of each internal optical connector 147, and a key 156 is disposed on the outer surface of the housing of each internal optical connector 147.

Although the external optical connectors 146 and the internal optical connectors 147 have substantially the same structures and functions, they are distinguished from each other by different reference numerals for easier recognition.

The ferrules 151 and 155 protrude, being pushed elastically from the inside in the axial direction. By inserting the ferrules 151 and 155 into cylindrical sleeves (not shown) in the optical connector adapters 135, the edges of the ferrules 151 and 155 are pressed by so that the optical fiber cores can be optically coupled.

The keys 152 and 156 engage keys 158 which are notches formed on both sides of each of the optical connector adapters 135, thereby making the connector inserting directions uniform.

Referring back to FIG. 8, the optical connector adapters 135 of the optical connector adapting unit 81 are diagonally disposed on an attachment board 161, so that all the optical connector adapters 135 are horizontally visible from the front. Here, the bottom surface 143 of the attachment metal fitting 121 is attached to the attachment board 161.

In this structure, the optical connectors 146 having the external optical fibers 131 connected thereto are inserted from the front into the optical connector adapting unit 81 in a direction diagonal to the front surface of the optical multiplexing communication apparatus 61. Accordingly, the external optical fibers 131 are bent at a low curvature, so are the internal optical fibers 148.

In the figure, the external optical fibers 131 are shown as if they were one fiber, but a plurality of external optical fibers 131 are actually introduced. The number of the internal optical fibers 148 introduced into the optical fiber passage 82 is also large.

Figure 8:
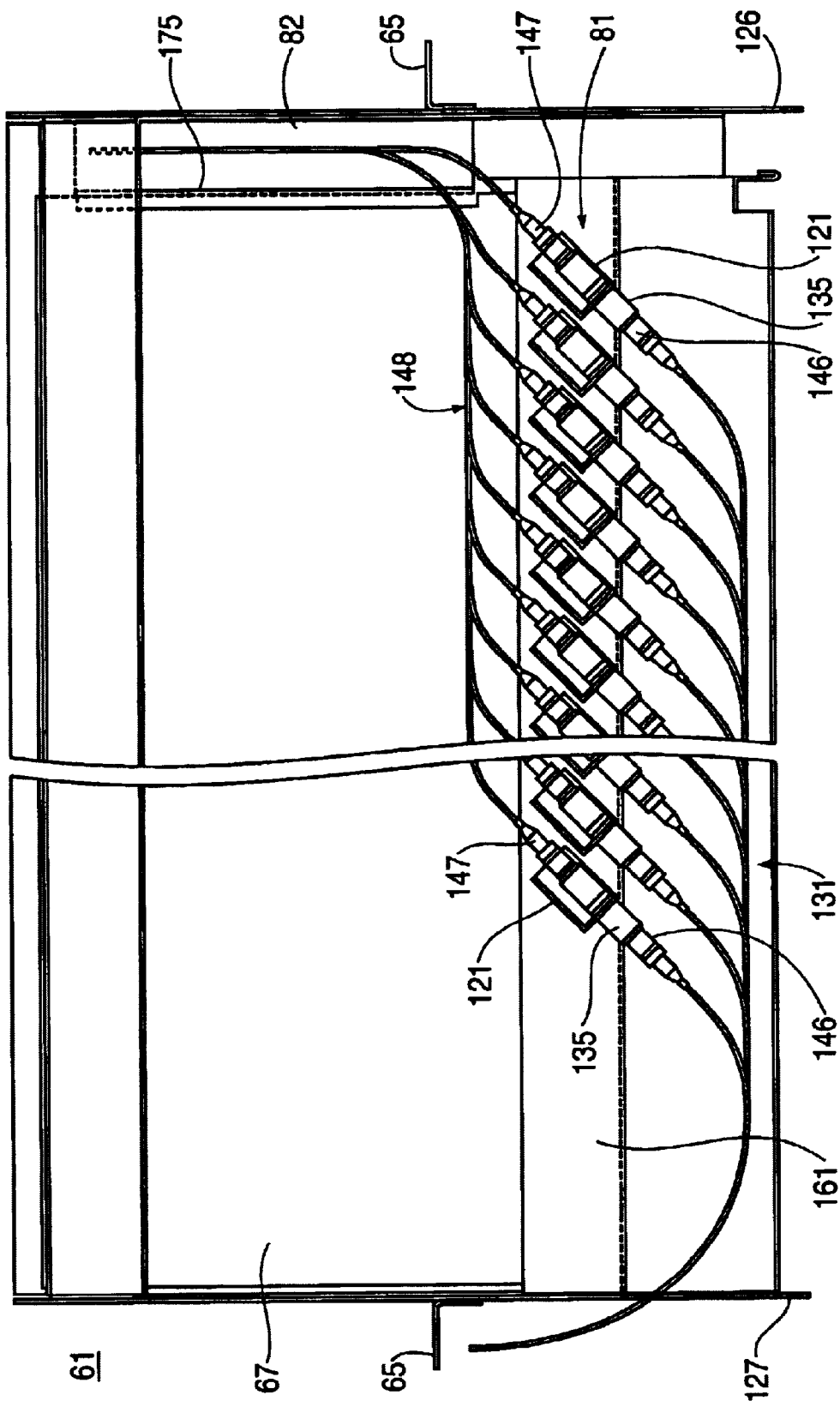
FIG. 8 is a schematic plan view of the apparatus of FIG. 7.

It is essential for the optical fibers to keep a certain bend radius so as to maintain desirable light transmission characteristics. By diagonally arranging the optical connector adapters 135 as shown in FIG. 8, the distance from the external optical fibers 131 to the internal optical fibers 148 can be made closer, while the bend radius can be made dramatically larger.

Compared with a case where the optical connector adapters 135 are placed in a direction perpendicular to the front surface of the apparatus, the distance between the external optical fibers 131 and the internal optical fibers 148 can be set at a desired length while a desired bend radius can be maintained. Thus, the mounting space for the optical fiber connector adapting unit 81 can be made narrower.

As for the space in the transverse direction, pulling around the optical fibers 131 and 148 requires a considerably large space even if the optical connector adapters 135 are placed in the direction perpendicular to the front face. So, there is no need to increase the space in the transverse direction.

Since the special mounting area for the optical connector adapting unit 81 is secured separately from mounting area for the printed board units, the optical fibers 131 and 148 can be more orderly arranged. Thus, the ease of production and maintenance can be dramatically improved.

The optical connector adapters are diagonally arranged, so that the external optical connectors 146 are visible horizontally in line from the front. With all the external optical connectors 146 being shown on the front surface, it is easy to detach a desired one of the external optical connectors 146.

As can be seen from FIG. 8, the mounting region of the optical connector adapting unit 81 and the connecting regions of the optical connectors 146 and 147 can be made dramatically shorter in depth, compared with the prior art. Here, there is no problem at all in disposing the air guide 67 on the rear side of the optical connector adapting unit 81. However, the disposing of the air guide. 67 is carried out in a particular manner as follows.

Figure 11:
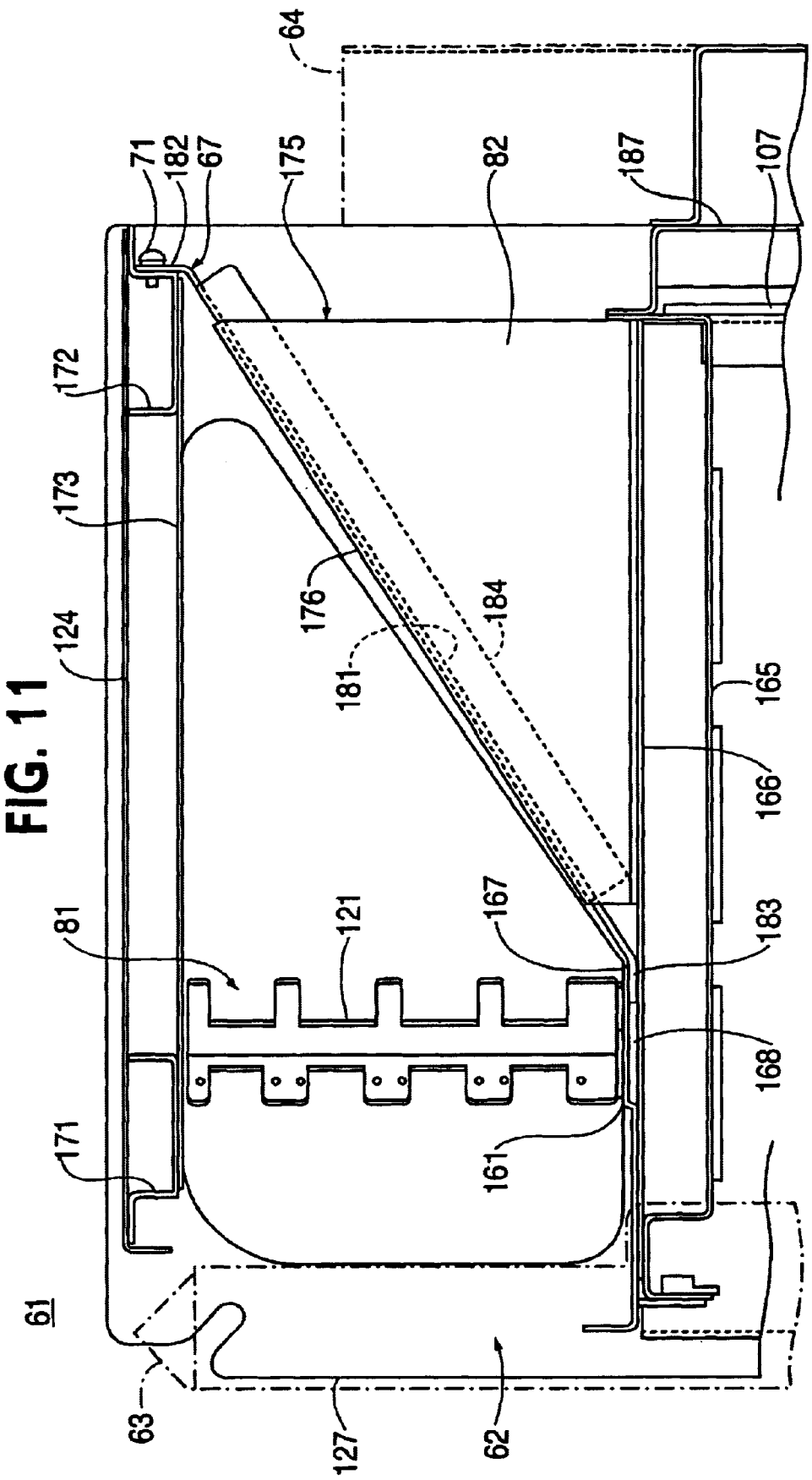
FIG. 11 is a schematic sectional view of the upper portion of the main housing.

FIG. 11 is a sectional side view of the uppermost portion of the apparatus 61 without the right sideboard 126. In this figure, the optical connector adapting portion 81 is shown without the optical connector adapters 135, and only the attachment metal fitting 121 is attached to the lower attachment board 161. Here, it should be noted that the left side in the figure is the front side of the apparatus and the right side in the figure is the rear side of the apparatus.

As shown in FIG. 11, an upper surface board 165 for mounting the printed board units is provided with guides and air holes, and a partition board 166 is formed above the upper surface board 165. The upper surface board 165 is held between the right and left sideboards 126 and 127, and serves as a coupling member for coupling the sideboards 126 and 127. The partition board 166 is also provided with a number of air holes (not shown).

The attachment board 161 which extends in the transverse direction when seen from the front is attached on the front side of the partition board 166. The rear half of the attachment board 166 is folded in a Z-shape to form a step surface 167 which is a step higher than the attachment board 166. A space 168 which is open on the rear side is formed between the step surface 167 and the partition board 166. The attachment metal fitting 121 of the optical connector adapting unit 81 is attached onto the step surface 167.

U-shaped coupling members 171 and 172 as reinforcement members which extend in the transverse direction when seen from the front are disposed in parallel with the partition board 166 to couple the right and left sideboards 126 and 127. The top board 124 also shown in FIG. 7 is disposed above the coupling members 171 and 172, and a coupling board 173 is disposed below the coupling members 171 and 172. The coupling board 173 is also provided with air holes.

In this structure, the optical connector adapting unit 81 is interposed between the partition board 166 and the coupling board 173. A separation wall 175 which has a right-triangle shape when seen from the side is formed on the partition board 166 on the rear side of the uppermost portion. The upper side of the separation wall 175 is inclined downward from the rear surface to the front surface. Folded rims 176 are formed along the inclination of the upper side of the separation wall 175.

Figure 12:
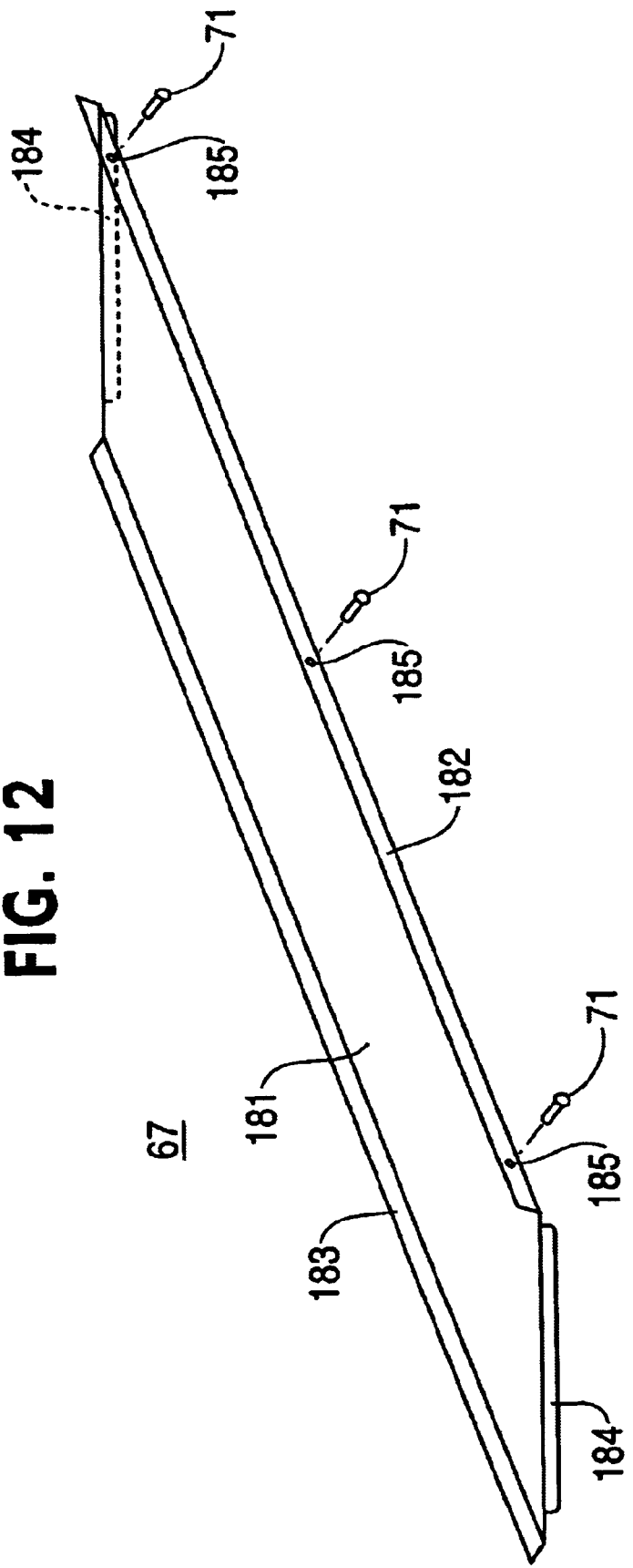
FIG. 12 is a perspective view of the air guide.

The upper rim of the air guide 67 is attached to the rear surface of the coupling member 172 with the attachment screws 71. FIG. 12 shows a perspective view of the air guide 67. As shown in FIG. 12, an inclined plate 181 has an upper rim 182 and a lower rim 183. The upper rim 182 is in a direction perpendicular to the lower rim 183, as shown in FIG. 11.

Both right and left rims of the inclined plate 181 are reinforcement rims 184 folded downward. The upper rim 182, the lower rim 813, and the reinforcement rims 184 surround the inclined plate 181 to maintain the flatness thereof. The upper rim 182 is provided with screw insertion holes 185 into which the attachment screws 71 are inserted.

The air guide 67 is formed by bending a suitable metal plate or synthetic resin plate. However, other materials having electric conductivity may be employed for the air guide 67 to prevent dust from adhering due to static electricity or to prevent electromagnetic waves from leaking to the outside.

Referring back to FIG. 11, the upper rim 182 of the air guide 67 is attached to the coupling member 172, as described above. Prior to the attachment of the upper rim 182, the lower rim 183 is inserted into the space 168 formed by the partition board 166 and the step surface 167 of the attachment board 161. The right reinforcement rim 184 of the inclined plate 181 is positioned under and in contact with the folded rim 176 of the partition wall 175. The space formed between the partition wall 175 and the right sideboard 126 is the optical fiber passage 82. The partition wall 175 shields the air discharging passage toward the rear surface under the air guide 67 from the optical fiber passage 82, thereby preventing air circulation between the two passages.

The front cover 63 is indicated by a two-dot chain line on the front side, and the optical fiber cover 64 is also indicated by a two-dot chain line on the rear side. The backboard 107 is also shown on the rear side, and a backboard cover is indicated by reference numeral 187.

Figure 13:
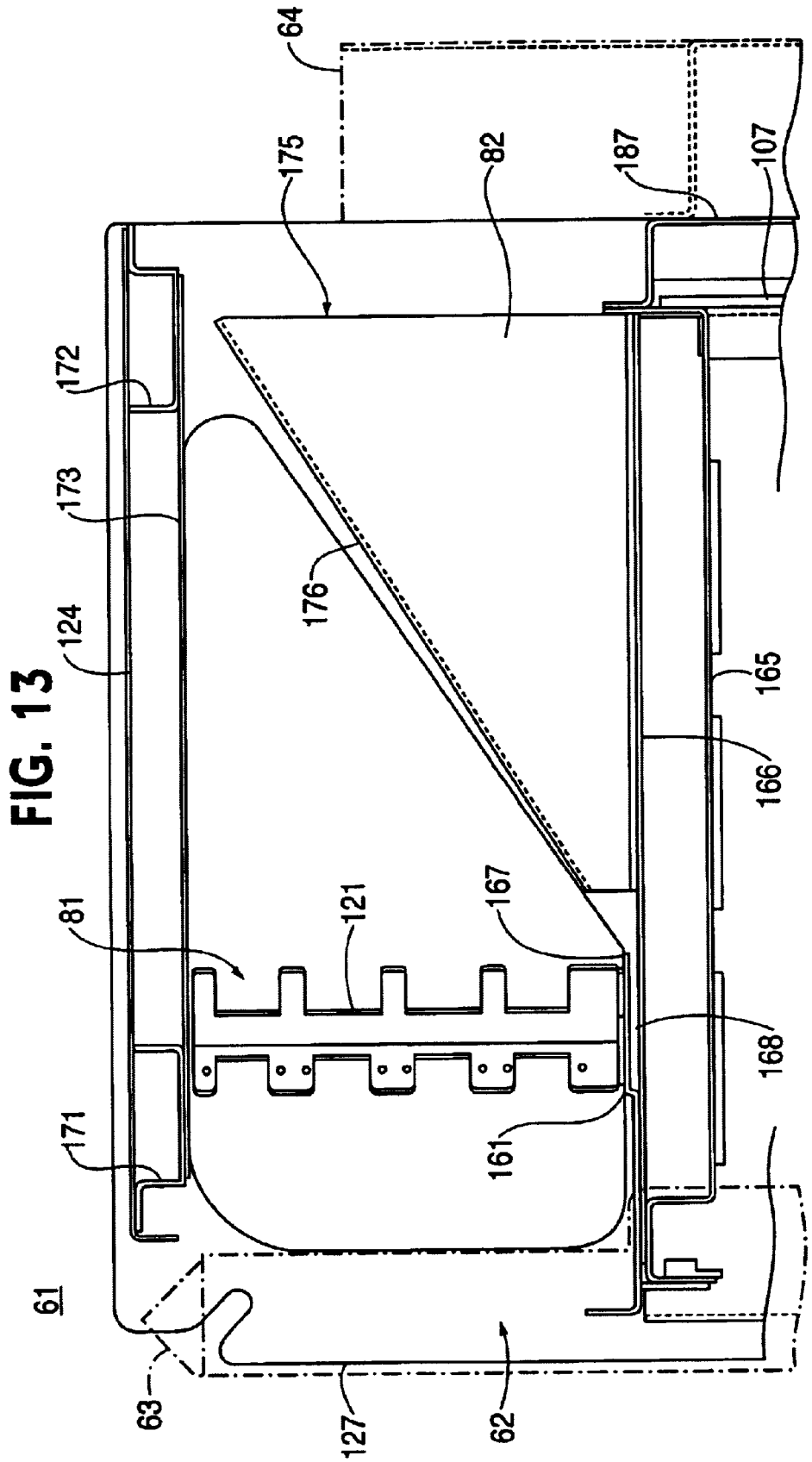
FIG. 13 shows the upper portion of the main housing of FIG. 11 without the air guide.

FIG. 13 is a sectional side view of the uppermost portion of the apparatus 61 of FIG. 11 minus the air guide 67 and the screws 71 for attaching the air guide 67.

The air guide 67 can be easily pulled out toward the rear side simply by unscrewing the screws 71, so that checking and handling the optical connector adapting unit 81 can be carried out between the partition board 166 and the coupling board 173. The air guide 67 can also be easily reattached to uppermost portion of the apparatus 61. With this structure, attaching and detaching the internal optical connectors 147 to and from the optical connector adapting unit 81 can be made easier simply by removing the air guide 67.

Figure 14:
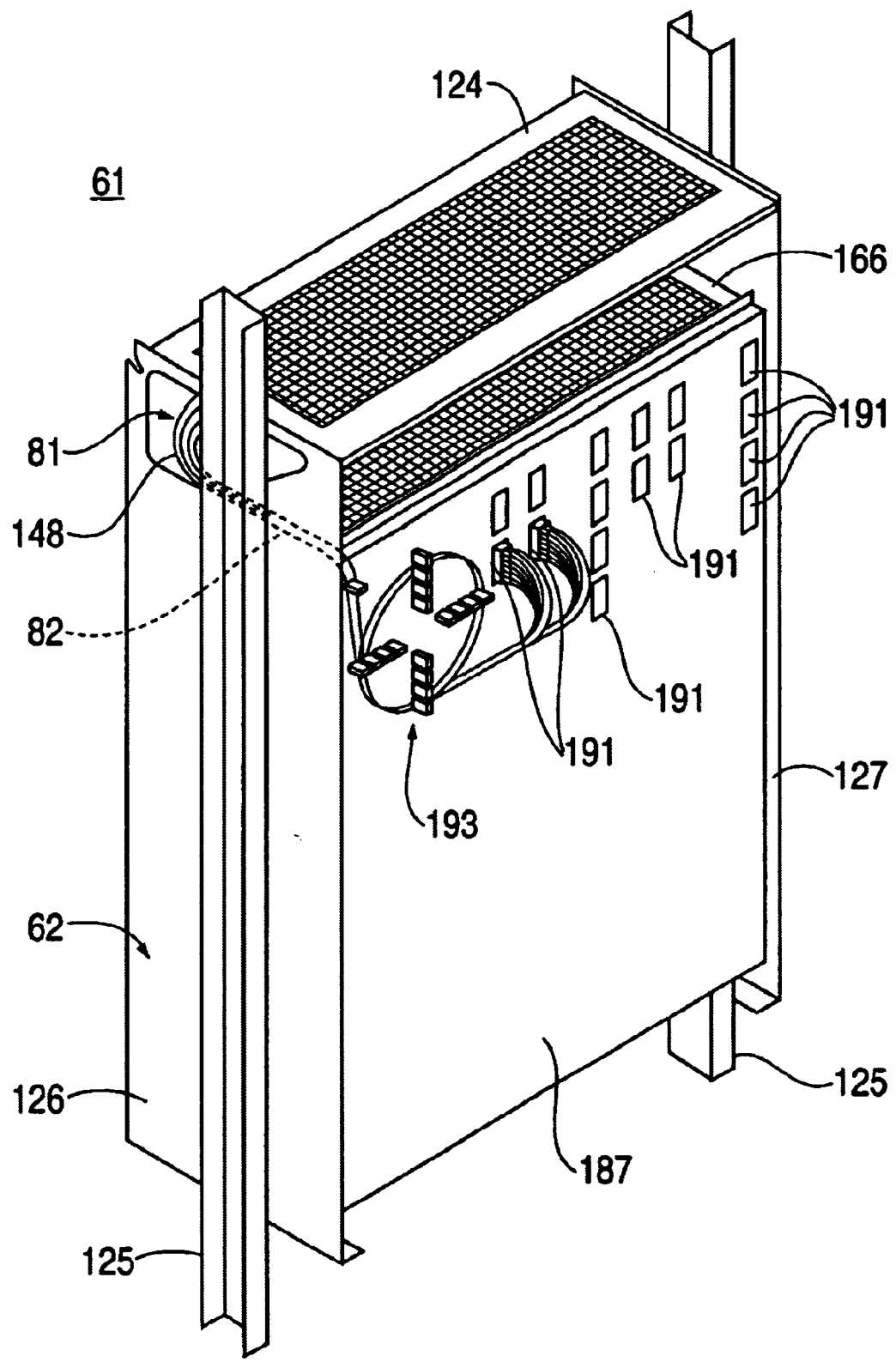
FIG. 14 is a perspective rear view of the apparatus without the optical fiber cover.

FIG. 14 is a perspective rear view of the optical multiplexing communication apparatus 61 with the optical fiber cover 64 removed. In this figure, the main housing 62 is supported by the pillars 125 on both sides, and is surrounded by the right and left sideboards 126 and 127, and the backboard cover 187. The top board 124 and the partition board 166 are shown in the uppermost portion. A large number of air holes are formed in both the top board 124 and the partition board 166. The backboard cover 187 is provided with through holes 191 corresponding only to the backboard optical connectors 108 arranged in vertical lines on the backboard 107 as shown in FIG. 4. In FIG. 14, other holes, connectors, and components are not shown to avoid unnecessary complication of the figure.

The internal optical fibers 148 are introduced from the optical connector adapting unit 81 to the rear surface of the backboard cover 187 via the optical fiber passage 82. Each of the internal optical fibers 148 has some extra length. Each extra length is wound around an extra length unit 193, and then introduced and connected to the backboard optical connectors 108 that can be seen through the through holes 191.

Figure 15:
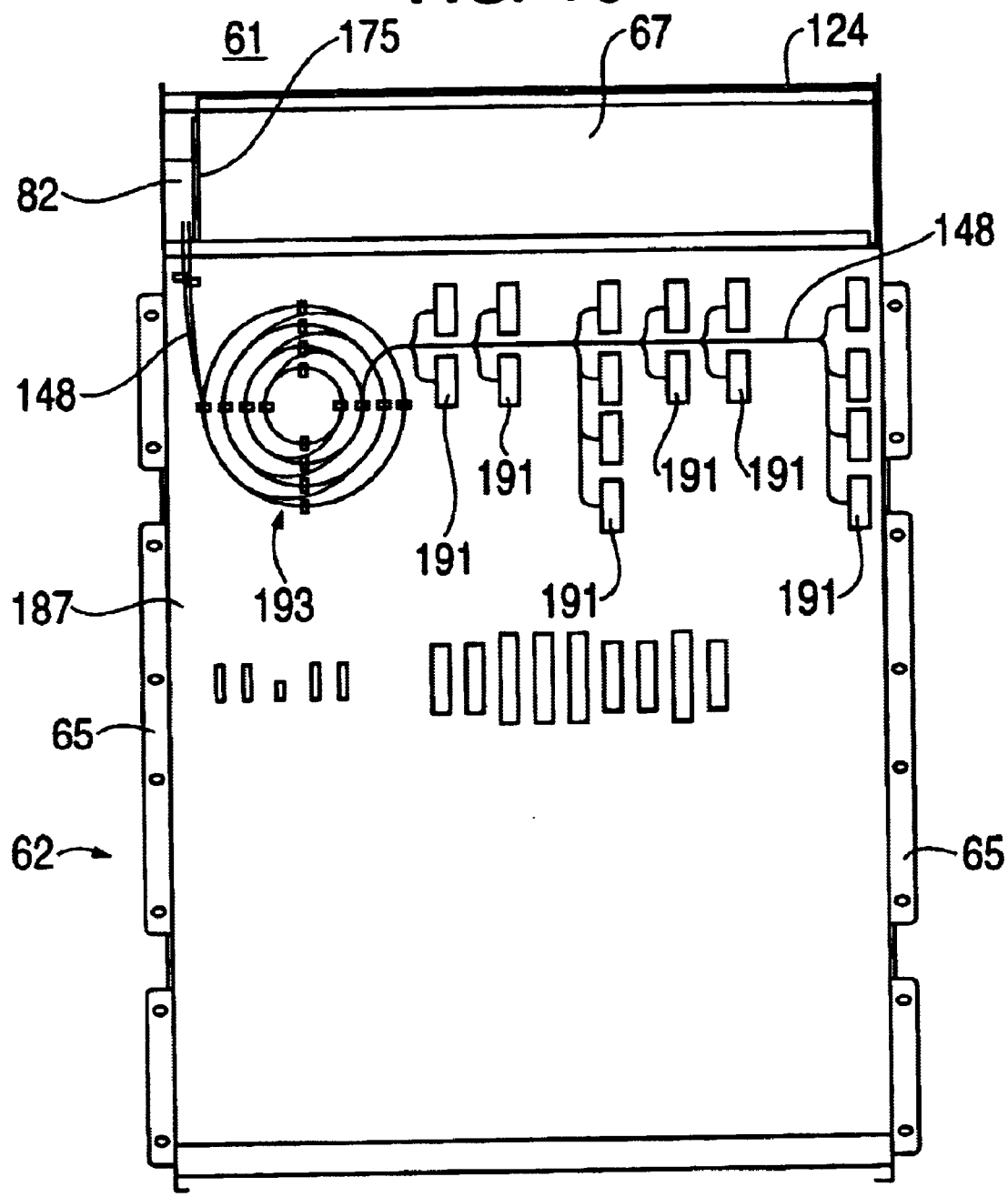
FIG. 15 is a rear view of the apparatus without the optical fiber cover.

Although the internal optical fibers 148 are only connected to two of the backboard optical connectors 108 in FIG. 14, a large number of optical fibers 148 are connected to the respective backboard optical connectors 108 as shown in FIG. 15. Each of the optical fibers 148 is concentrically wound around the extra length unit 193 a few times.

Figure 16:
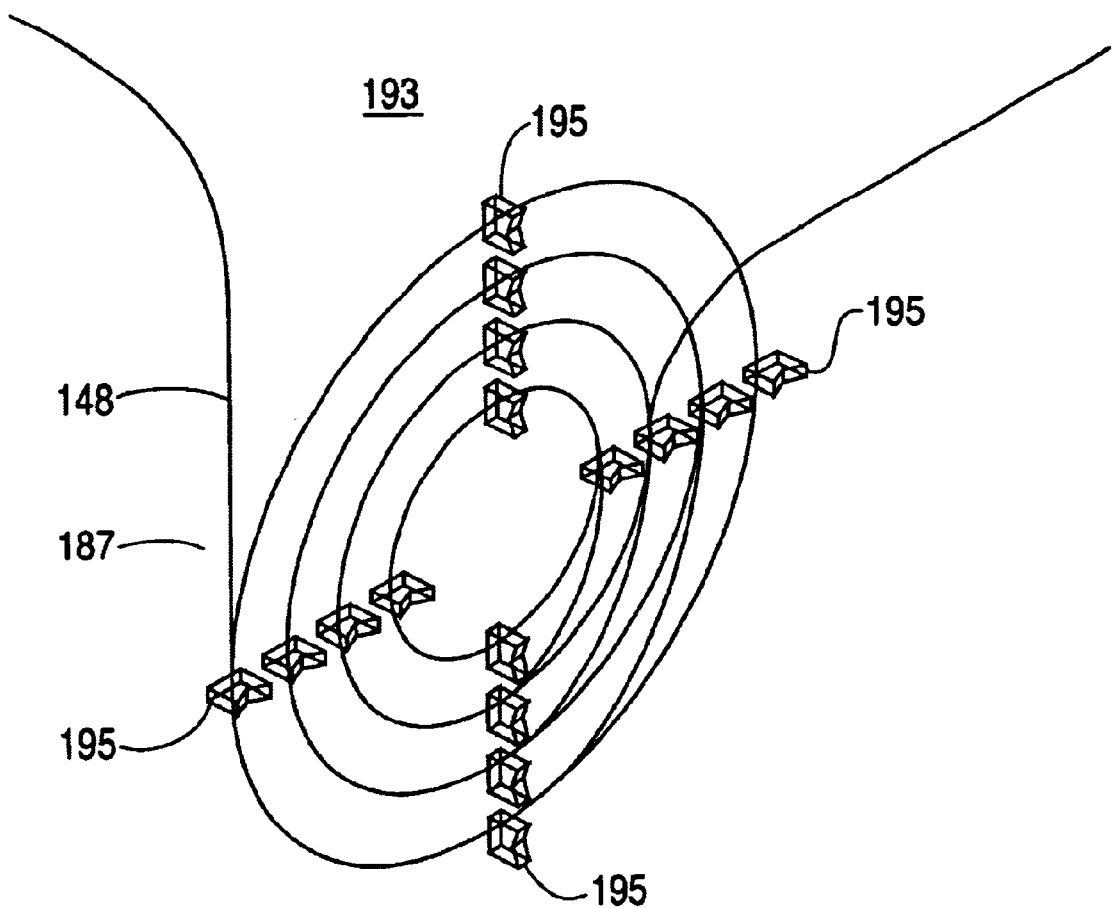
FIG. 16 is a schematic perspective view of an excess optical fiber accommodating unit.

FIG. 16 is a perspective view of the extra length unit 193 with one of the internal optical fibers 148. As shown in this figure, a plurality of cable holders 195 stand from the surface of the backboard cover 187. The cable holders 195 are arranged crosswise and on concentric circles at certain intervals in radius directions. Each of the internal optical fibers 148 is wound in circles and held by the cable holders 195.

The radius of the optical fiber held by the innermost cable holders 195 is larger than the minimum bend radius of an optical fiber in terms of transmission characteristics.

Figure 17A:
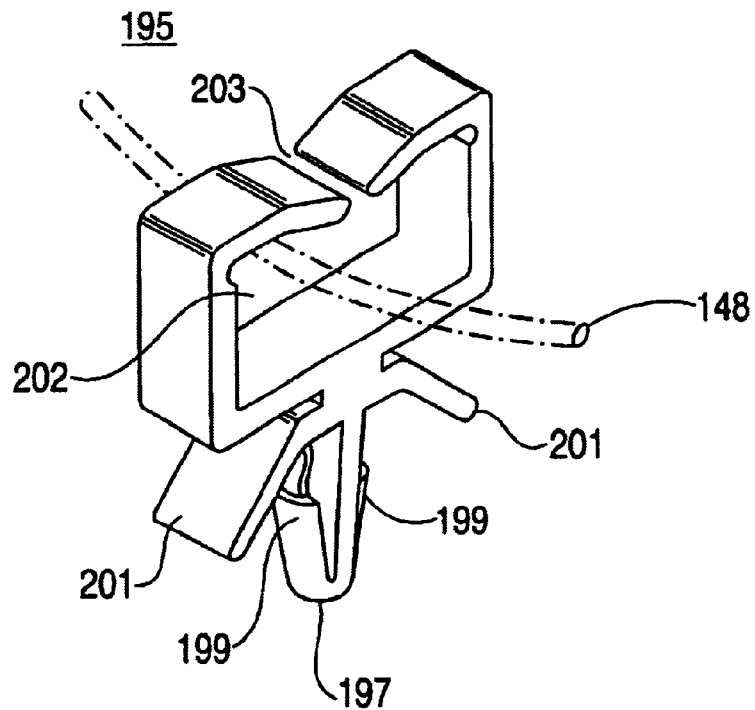
FIG. 17A is a perspective view of a cable holder.
Figure 17B:
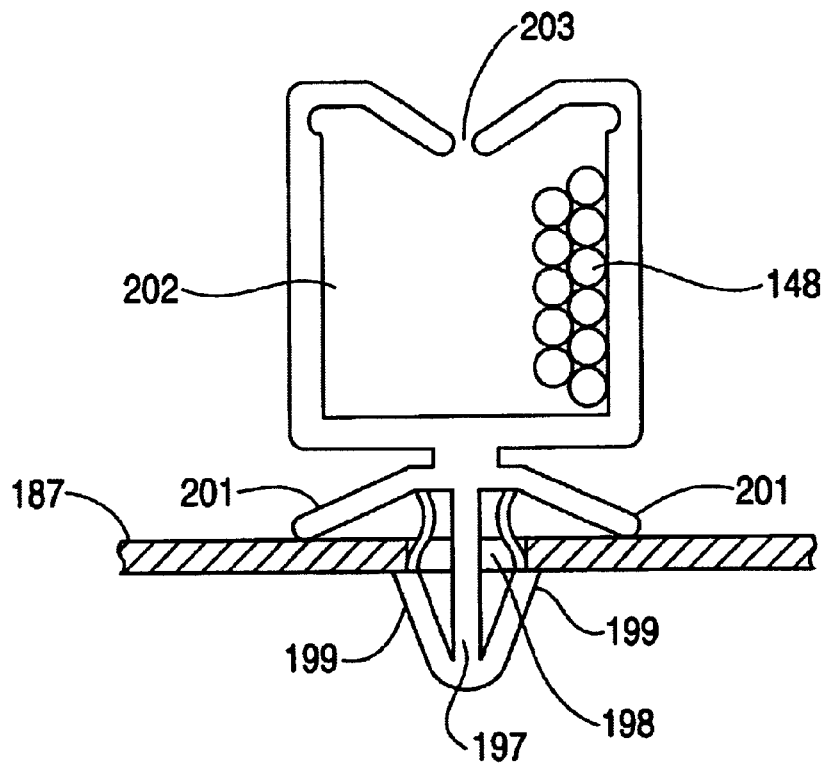
FIG. 17B shows the cable holder in an attached state.

FIG. 17A is a perspective view of one of the cable holders 195, and FIG. 17B is a side view of one of the cable holders 195 attached to the backboard cover 187. Each of the cable holders 195 is integrally made of synthetic resin having strength and elasticity. A leg portion 197 protruding downward from the center penetrates through an insertion hole 198 formed in the backboard cover 187, so that stoppers 199 on both sides of the leg portion 197 are engaged with the lower surface of the backboard cover 187. Thus, the backboard cover 187 is sandwiched between the stoppers 199 and a pair of spring portions 201 on the upper surface, thereby securing the cable holder 195.

An internal optical fiber 148 is forcibly inserted into a frame-like receiving portion 202 through an opening 203, as shown in FIG. 17A.

Although only one internal optical fiber 148 is shown in FIGS. 16 and 17A for ease of explanation, a number of optical fibers are actually wound in sets, and are held by the cable holders 195 disposed in necessary positions to avoid confusion or complication.

Figure 18:
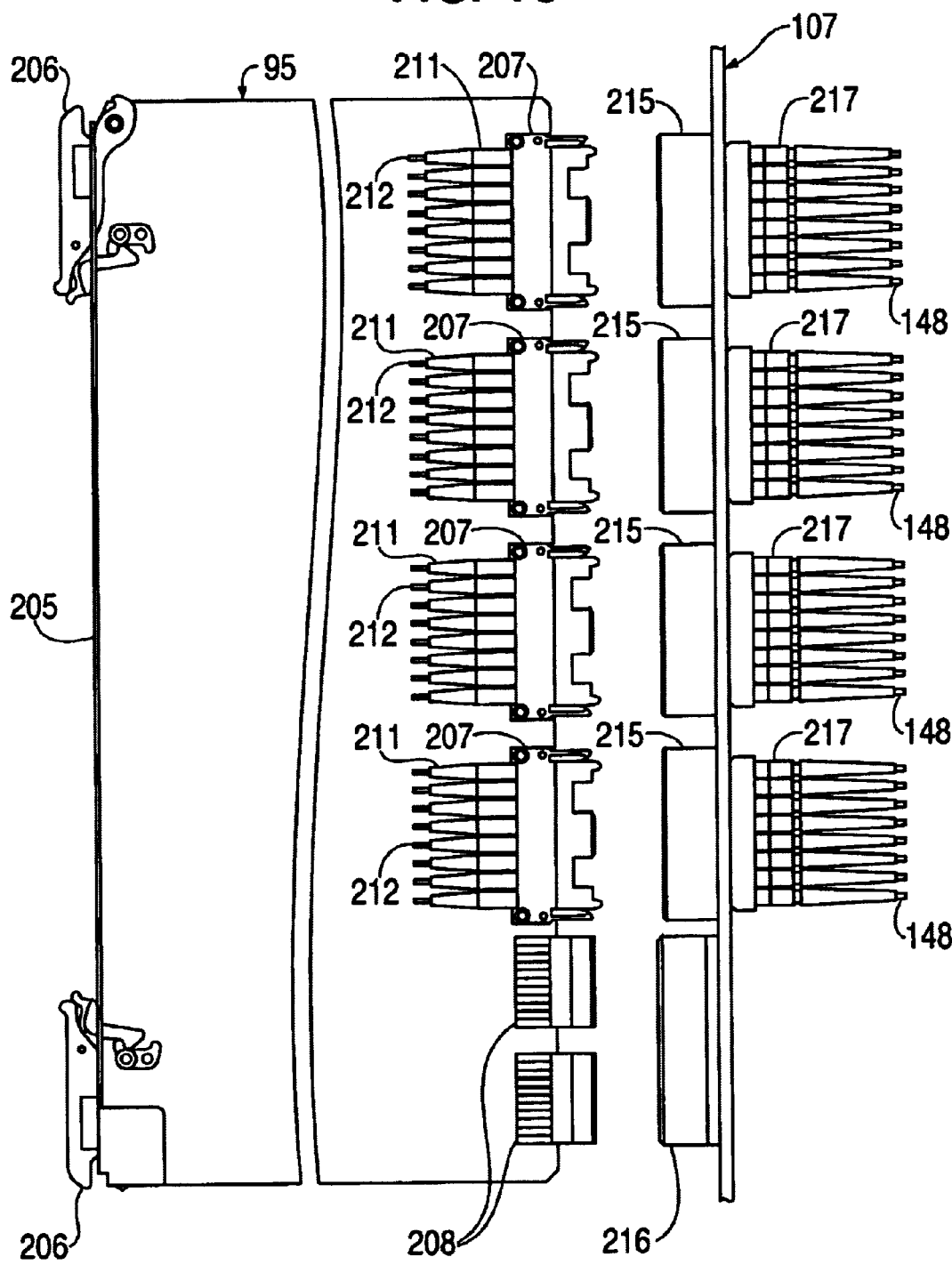
FIG. 18 illustrates optical fiber connection between the backboard and the printed board units.

FIG. 18 is a more detailed side view of the backboard 107 and one of the printed board units. The printed board unit 95 shown in this figure is the light wavelength separating unit shown in FIG. 3. The printed board unit 95 is yet to be connected to the connectors on the backboard 107.

A front board 205 is formed on the front of the printed board unit 95, and a pair of insertion members 206 to be engaged with openings of a shelf are formed at the top and bottom of the front board 205. Four printed board unit optical connectors 207 and two multipolar printed board unit optical connectors 208 are mounted on the rear surface of the printed board unit 95. Eight optical connectors 211 are inserted into each of the printed board unit optical connectors 207 from the front side, so that optical fibers 212 of the respective optical connectors 211 are connected to an optical circuit or an optical element module (not shown) in the printed board unit 95.

The backboard 107 is mounted with four backboard optical connectors 215 (108) and two backboard electric connector 216 (109) corresponding to the connectors on the printed board unit 95.

Eight optical connectors 217 are inserted into each of the backboard optical connectors 215 from the rear side, and the internal optical fibers 148 introduced from the optical connector adapting unit 81 shown in FIGS. 8, 14, and 15 are connected to each of the optical connectors 217.

The insertion and connection of the optical connectors 217 to the backboard optical connectors 215 are not shown in FIG. 18, but the optical connectors 217 can be easily inserted into the backboard optical connectors 215 through the through holes 191 in the backboard cover 187 adjacent to the backboard 107, as shown in FIGS. 14 and 15. A large part of the rear surface of each of the optical connectors 217 protrudes toward the rear surface of the backboard cover 187.

It should be noted that the optical connectors 211 and 217 can be individually attached to and detached from the printed board unit optical connectors 207 and the backboard optical connectors 215, respectively.

In the state shown in FIG. 18, the printed board unit 95 is moved toward the backboard 107, thereby connecting all the corresponding connectors to each other. The ferrule edges of the corresponding optical connectors 211 and 217 are pressed toward each other, so that the corresponding optical connectors 211 and 217 are optically connected to each other. The contacts of the corresponding electric connectors are brought into contact with each other, so that the corresponding electric connectors are electrically connected to each other.

Figure 19:
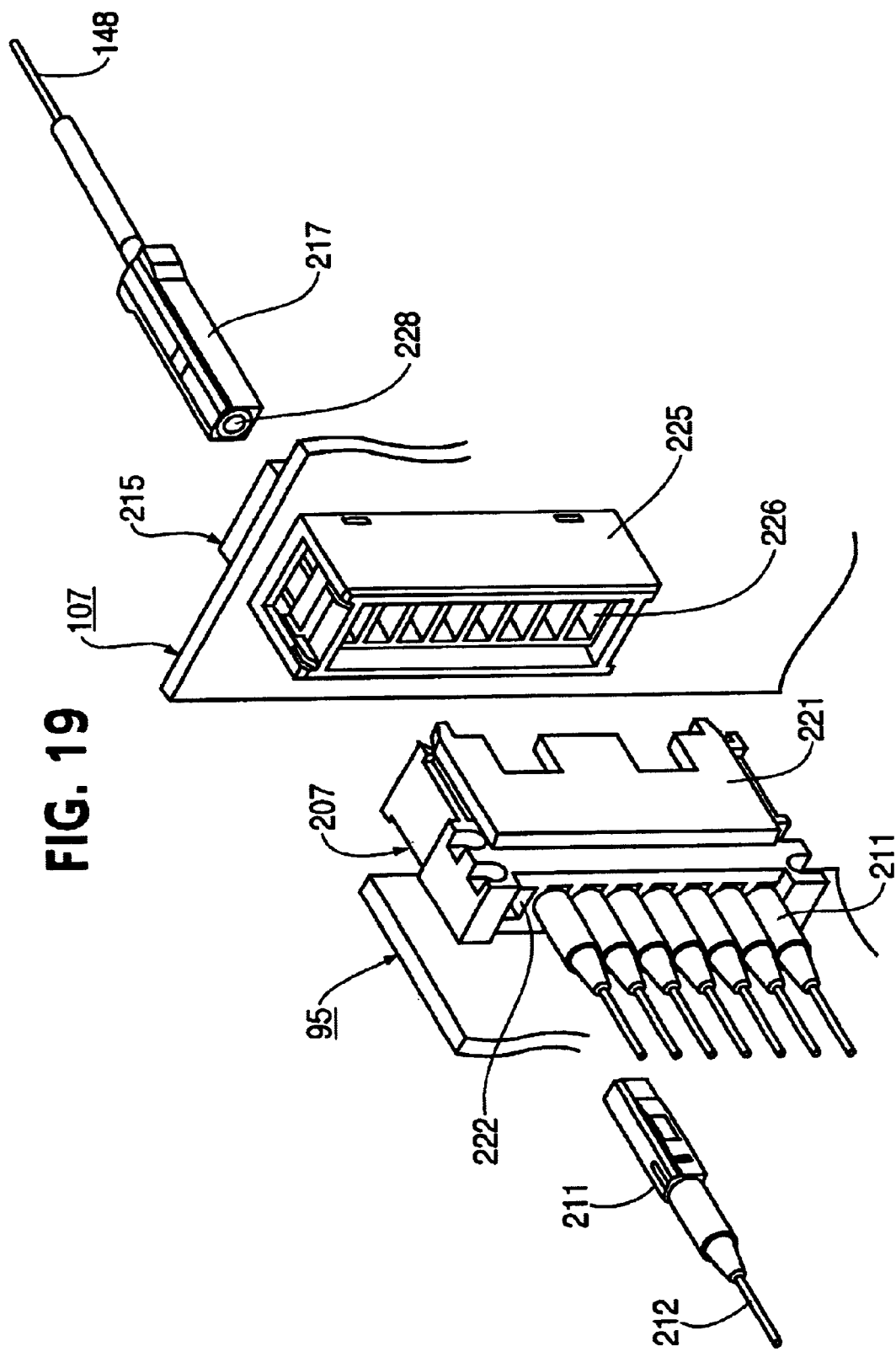
FIG. 19 is a perspective view of the connection of FIG. 18.

FIG. 19 is a schematic perspective view of one of the printed board unit connectors 207 and the corresponding backboard optical connector 215. A connector housing 221 attached to the printed board unit 95 is provided with eight through holes 222 into which the optical connectors 211 are inserted. The through holes 222 are arranged vertically in line, and hold the optical connectors 211 as shown in the figure. Although not shown in the figure, a ferrule held and secured around the optical fiber core of each of the optical fibers 212 protrudes from the edge of each corresponding optical connector 211. The ferrule protrudes rearward inside the connector housing 221.

A connector housing 225 attached to the backboard 107 is also provided with eight through holes 226 into which the optical connectors 217 are inserted. The through holes 226 are arranged vertically in line, and hold the optical connectors 217 as shown in the figure. A ferrule 228 held and secured around the optical fiber core of each of the optical fibers 148 protrudes from the edge of each corresponding optical connector 217. The ferrule 228 protrudes forward inside the connector housing 221.

By inserting the printed board unit 95, the printed board unit optical connectors 207 are engaged with the backboard optical connectors 215. Here, the ferrules of the corresponding optical connectors 211 and 217 arranged in a section are pressed to each other, so that the optical fiber cores are optically connected to each other.

As described so far, the optical connector adapters are arranged in a diagonal direction on the optical multiplexing communication apparatus of the present invention. With this structure, increasing and decreasing the number of lines, and exchanging lines can be easily carried out, whenever necessary, without stopping the operation of the apparatus. With the maximum volume of lines necessary being set and mounted to the printed board units, requested changes can be immediately made to the apparatus on its front side without taking any special procedure.

If necessary, changing the connection of the optical fibers or exchanging the optical fibers may also be carried out on the rear side of the apparatus after detaching the air guide. Even in such a case, the apparatus can remain in the operating state.

Furthermore, high-density and high-volume optical fiber introduction is possible by connecting the optical connectors to the printed board units on the rear side of the apparatus. Accordingly, there is no need to provide optical circuits to a plurality of printed board units as in the prior art, and the number of printed board units can be set at a minimum. This, together with the employment of high-density optical modules, efficiently satisfies the demands for smaller and higher-density apparatuses.

Figure 30A:
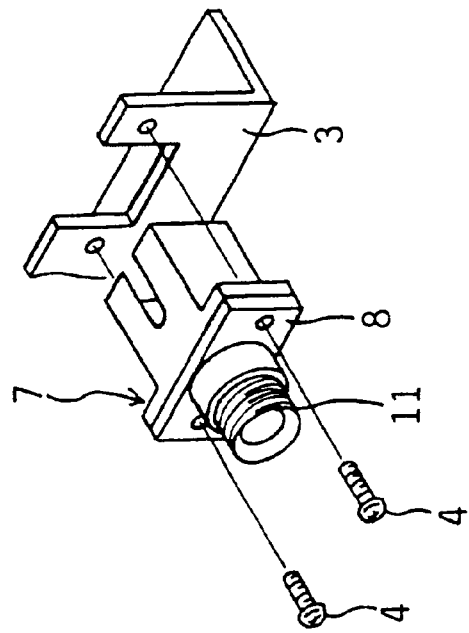
FIGS. 30A and 30B illustrate another optical connector adapting structure with a coupler.
Figure 30B:
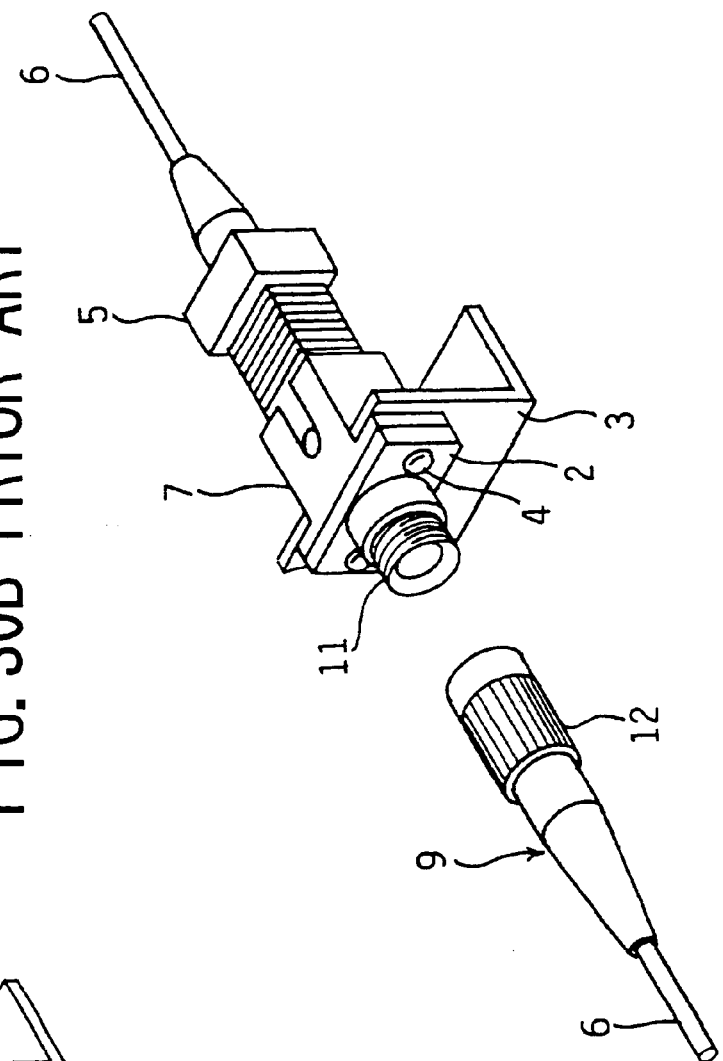
Figure 31A:
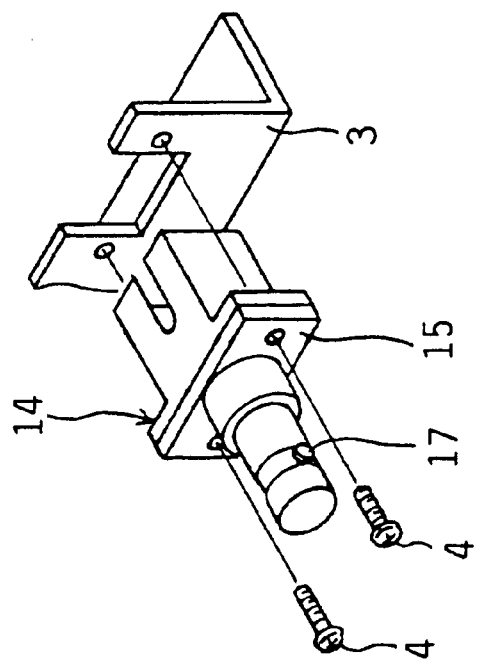
FIGS. 31A and 31B illustrate yet another optical connector adapting structure with a connector.
Figure 31B:
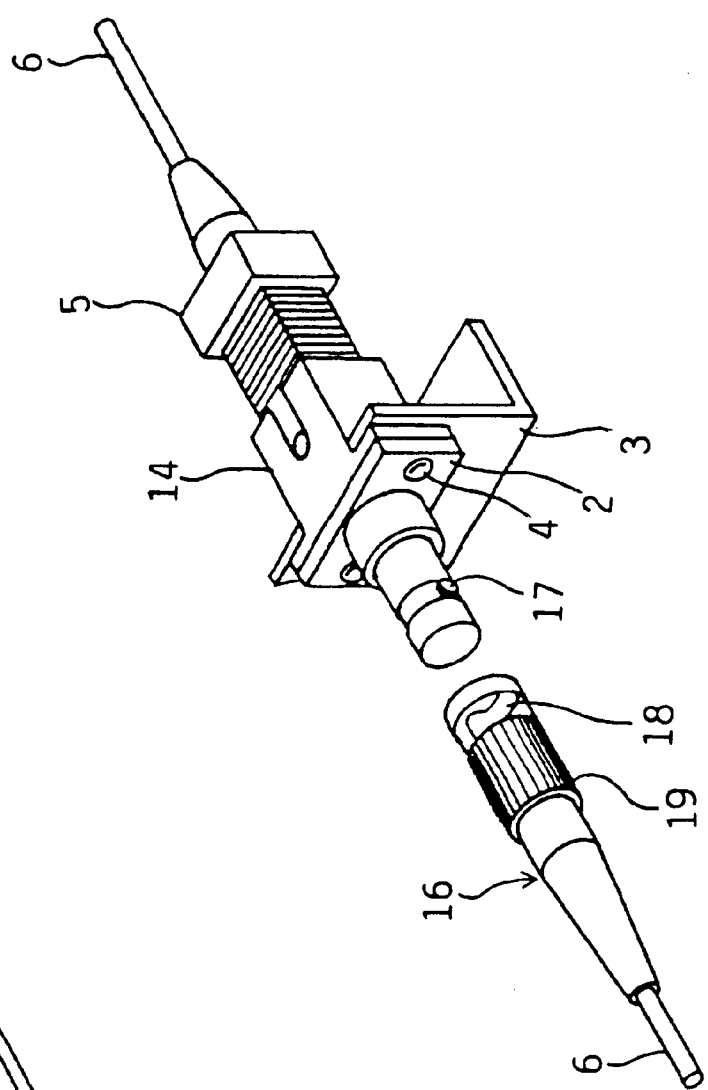
Figure 32:
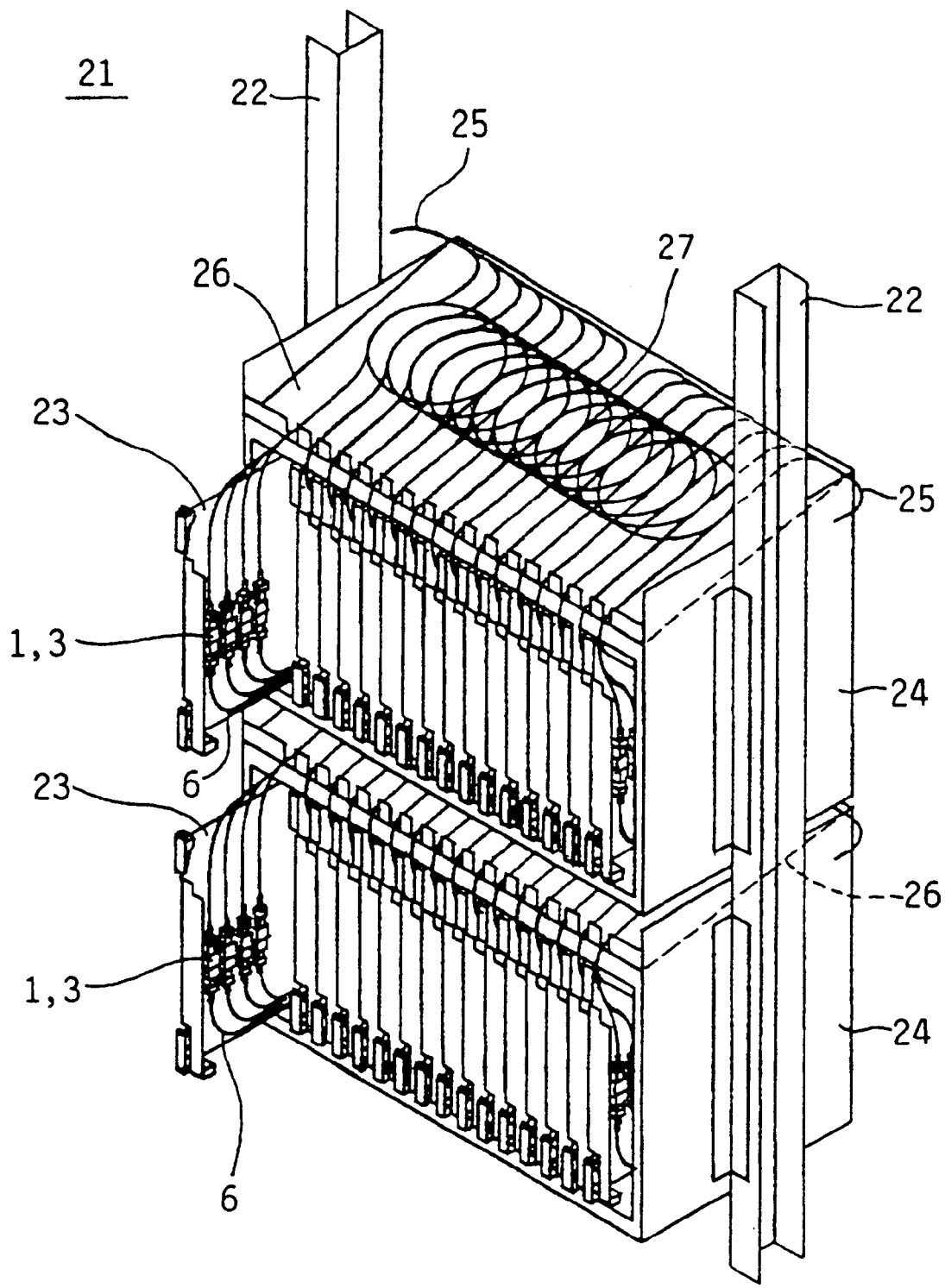
FIG. 32 is a perspective view of an optical multiplexing communication apparatus of the prior art.
Figure 33:
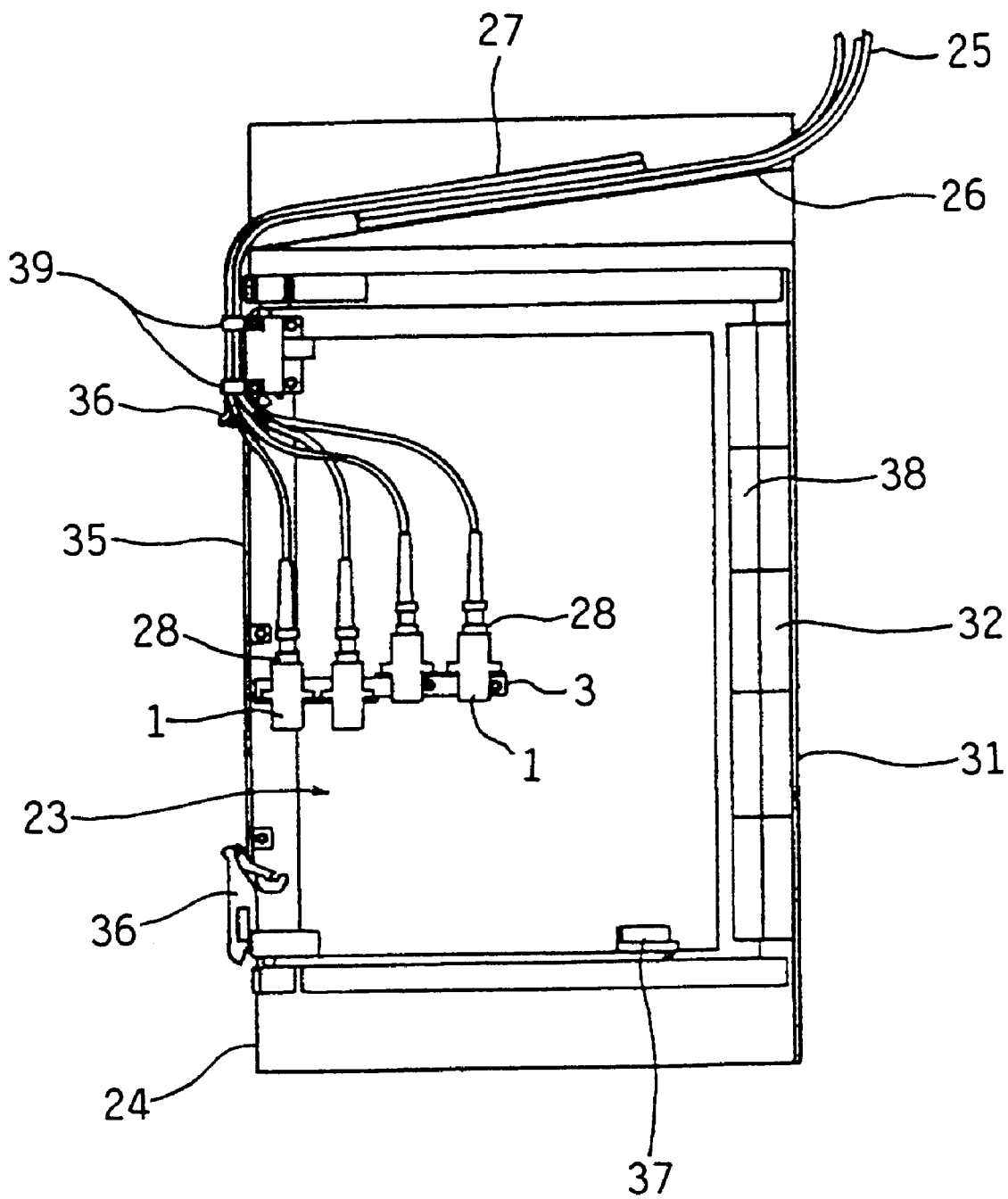
FIG. 33 is a schematic sectional view of the apparatus of FIG. 32.
Figure 34:
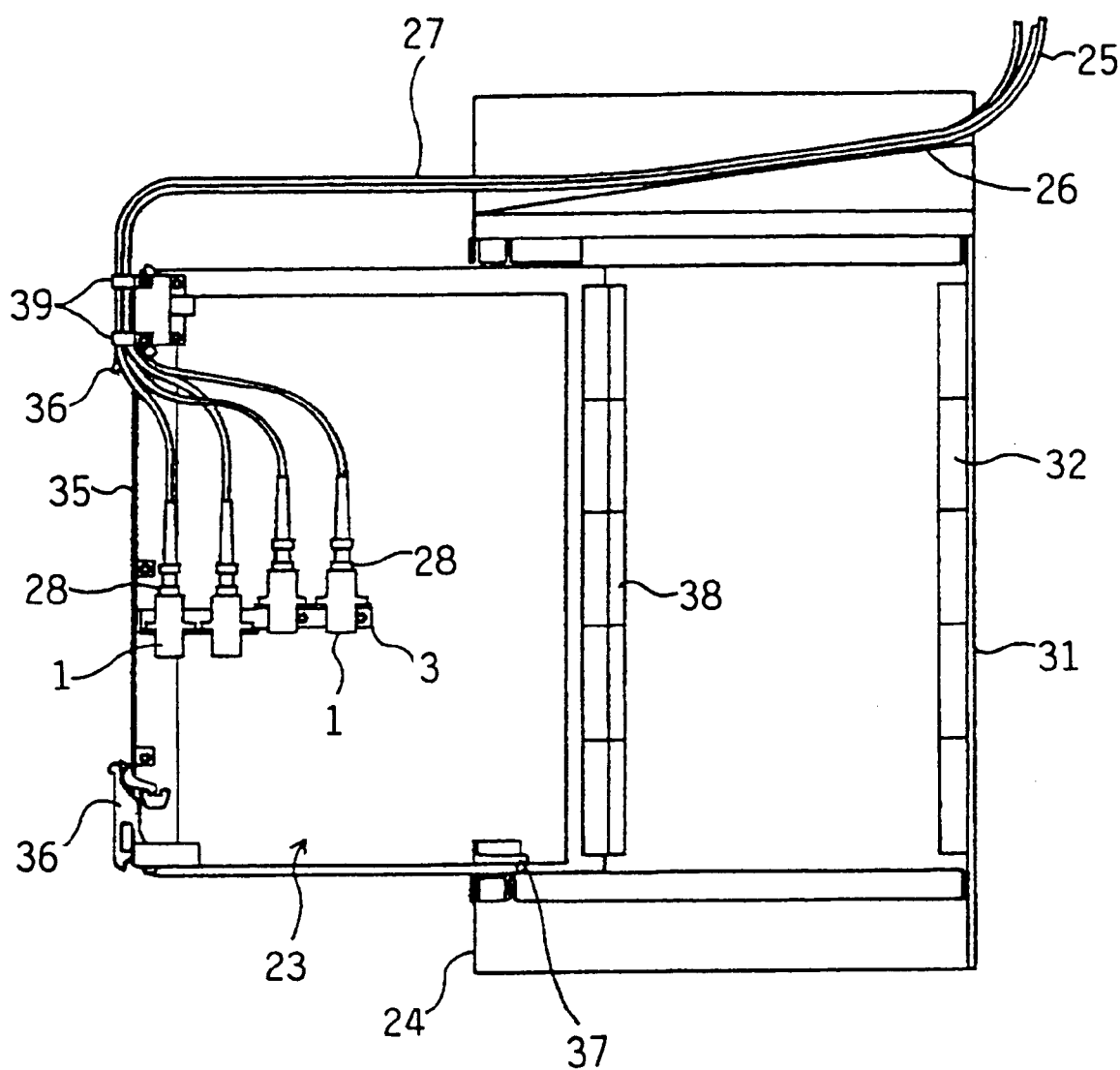
FIG. 34 is a schematic sectional view of the apparatus of FIG. 32.
Figure 35:
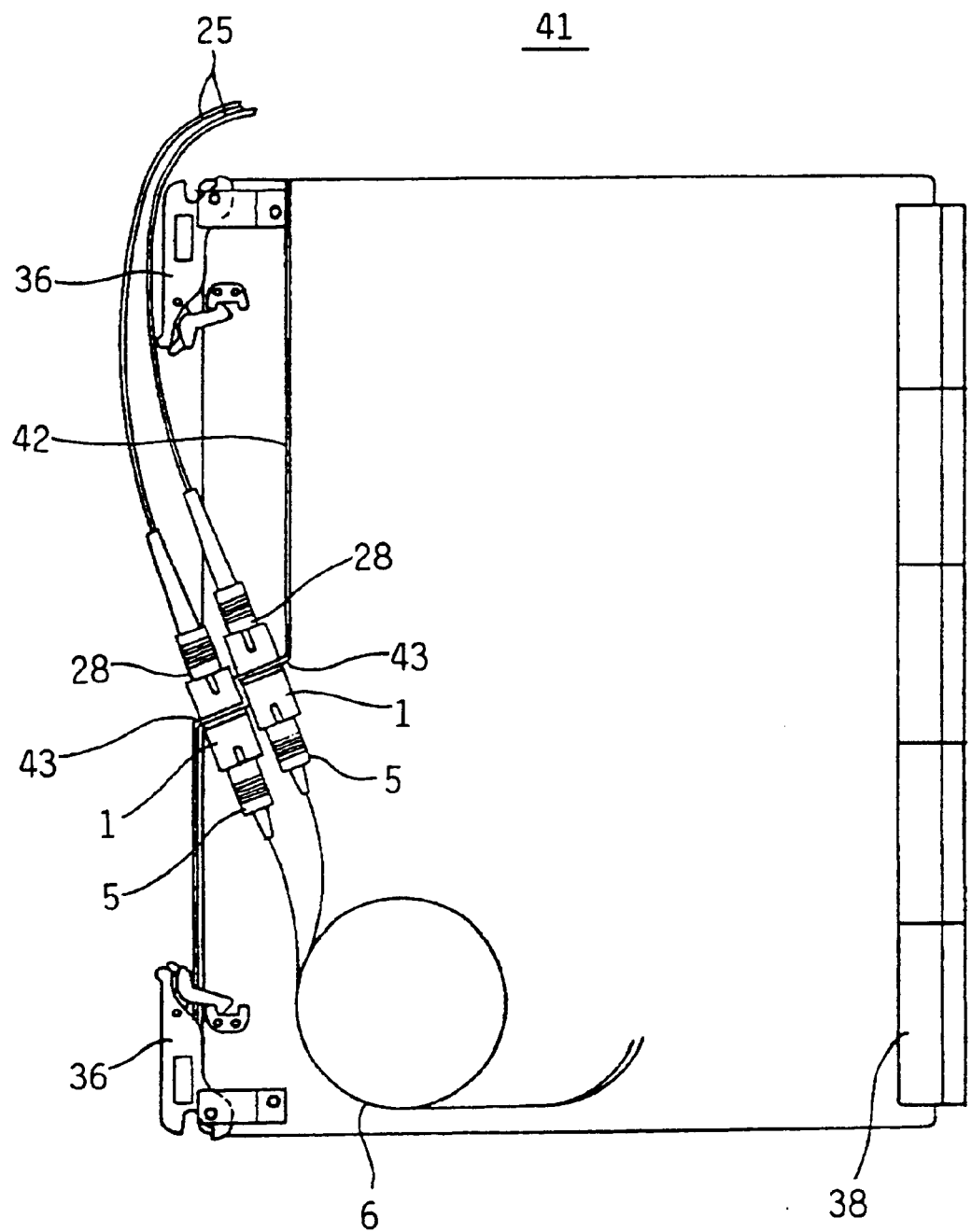
FIG. 35 is a side view of another example of a printed board unit of the prior art.
Figure 36:
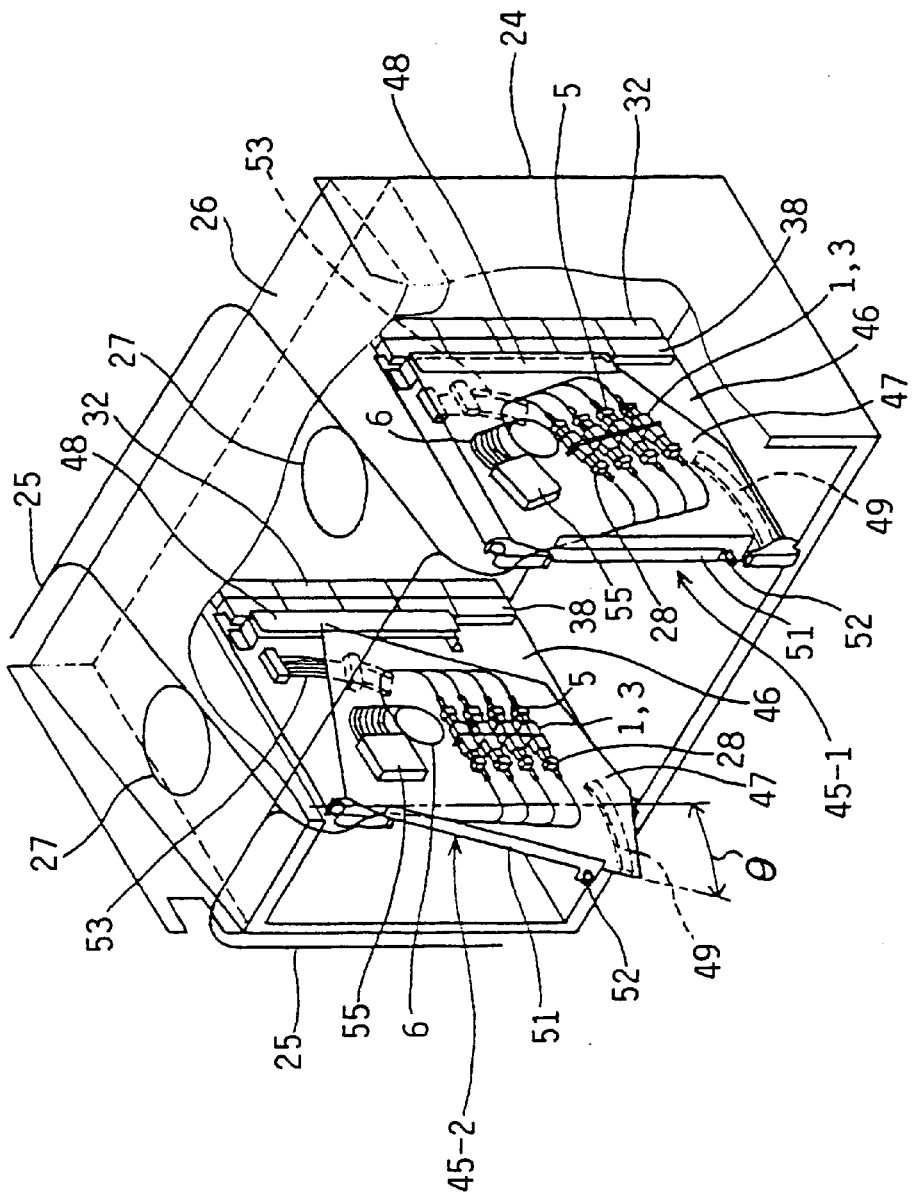
FIG. 36 is a perspective view of another example of an optical multiplexing communication apparatus of the prior art.
Figure 37:
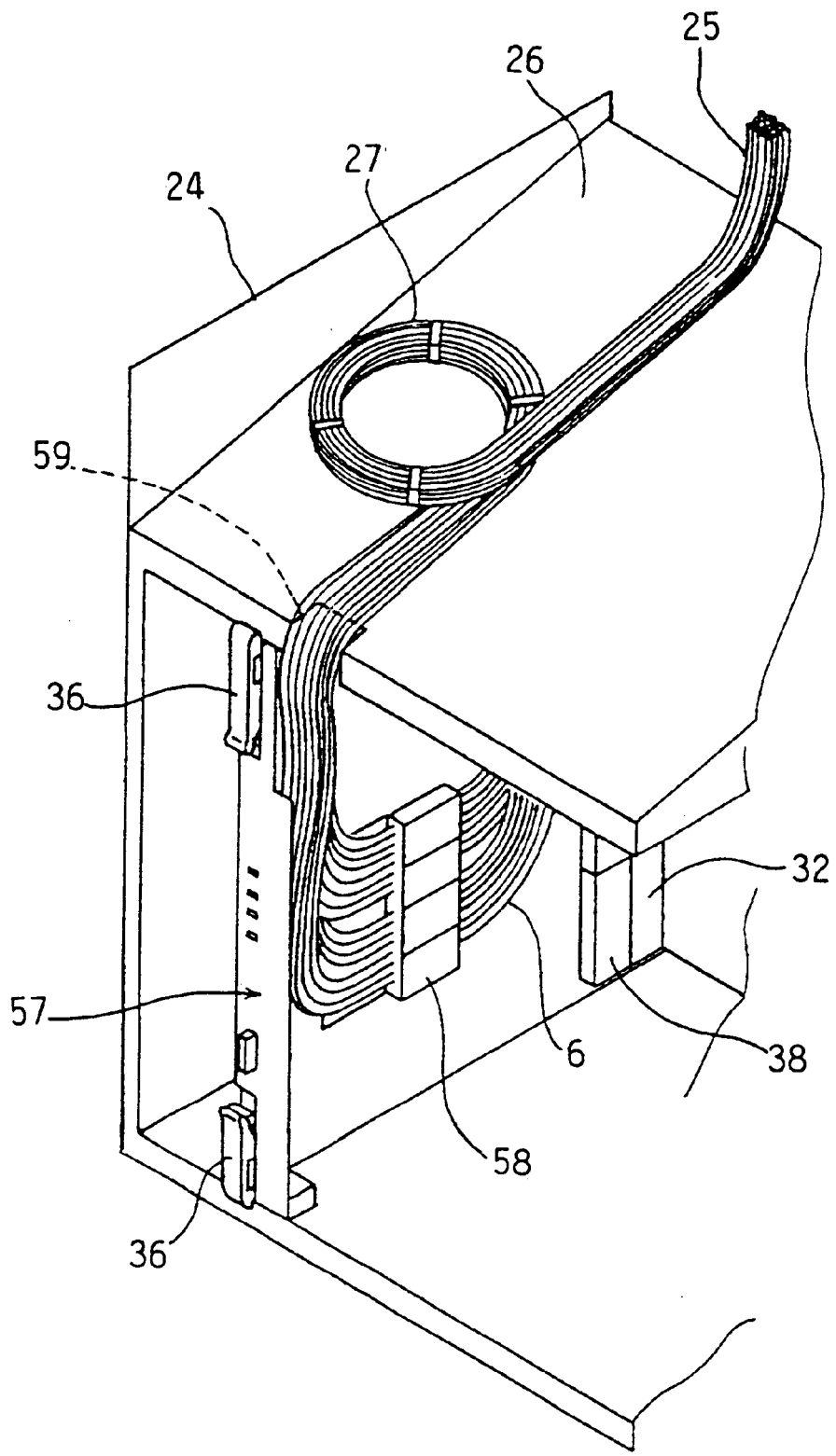
FIG. 37 is a perspective view of yet another example of an optical multiplexing communication apparatus of the prior art.

The electronic apparatus of the present invention is not limited to the above structure, but it is possible to combine the above optical connector adapting unit with any of the structure of the prior art shown in FIGS. 29 to 31. Also, the optical connectors may be connected to the optical connector adapting unit only on its front side, with the optical fibers being directly connected to the rear side. It should be understood that the electronic apparatus can also be used to connect optical fiber transmission paths of a communication apparatus or an information processing apparatus.

A second embodiment of the present invention will now be described.

Figure 20:
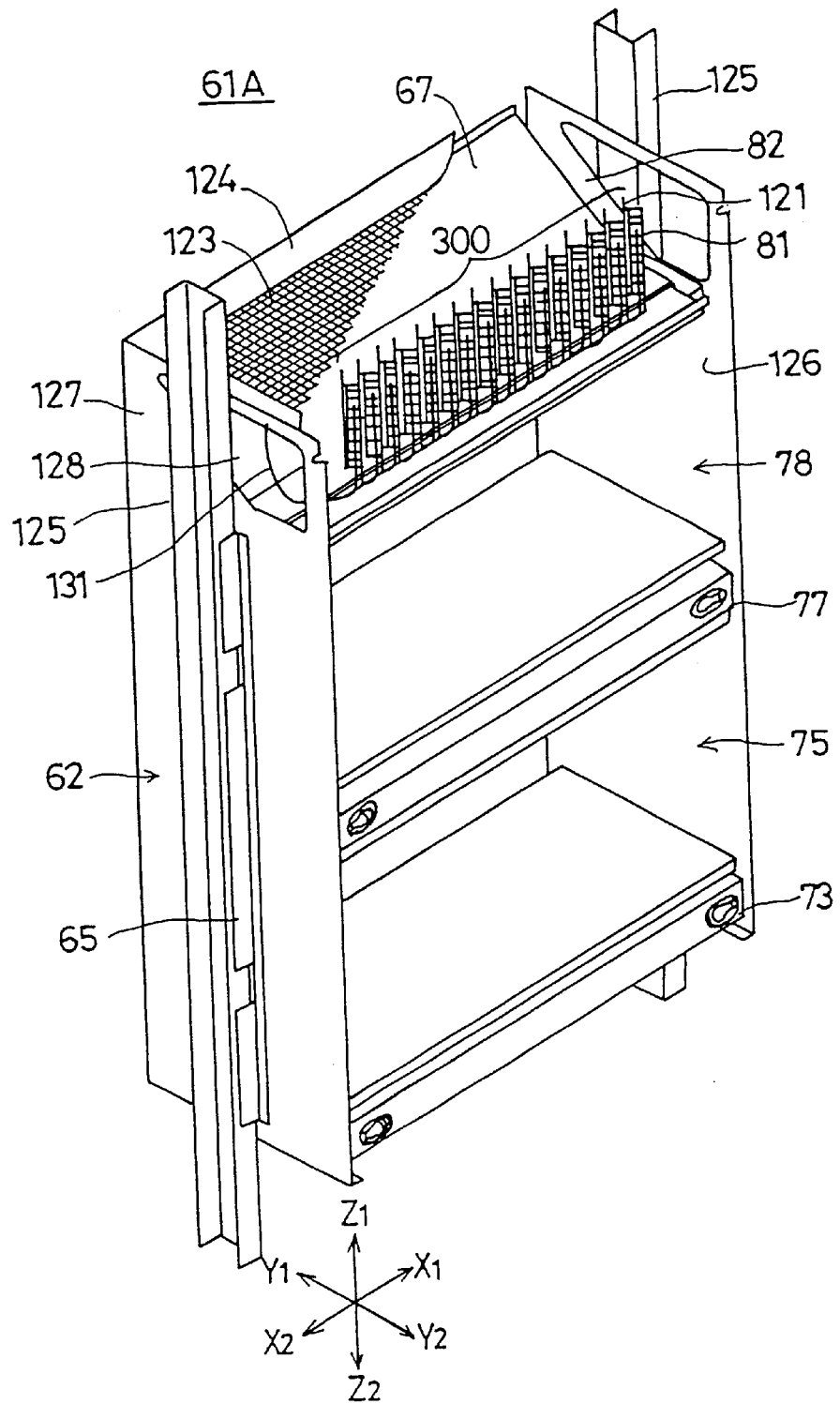
FIG. 20 is a perspective view of a second embodiment of an optical multiplexing communication apparatus, without printed board units, in accordance with the present invention.
Figure 21:
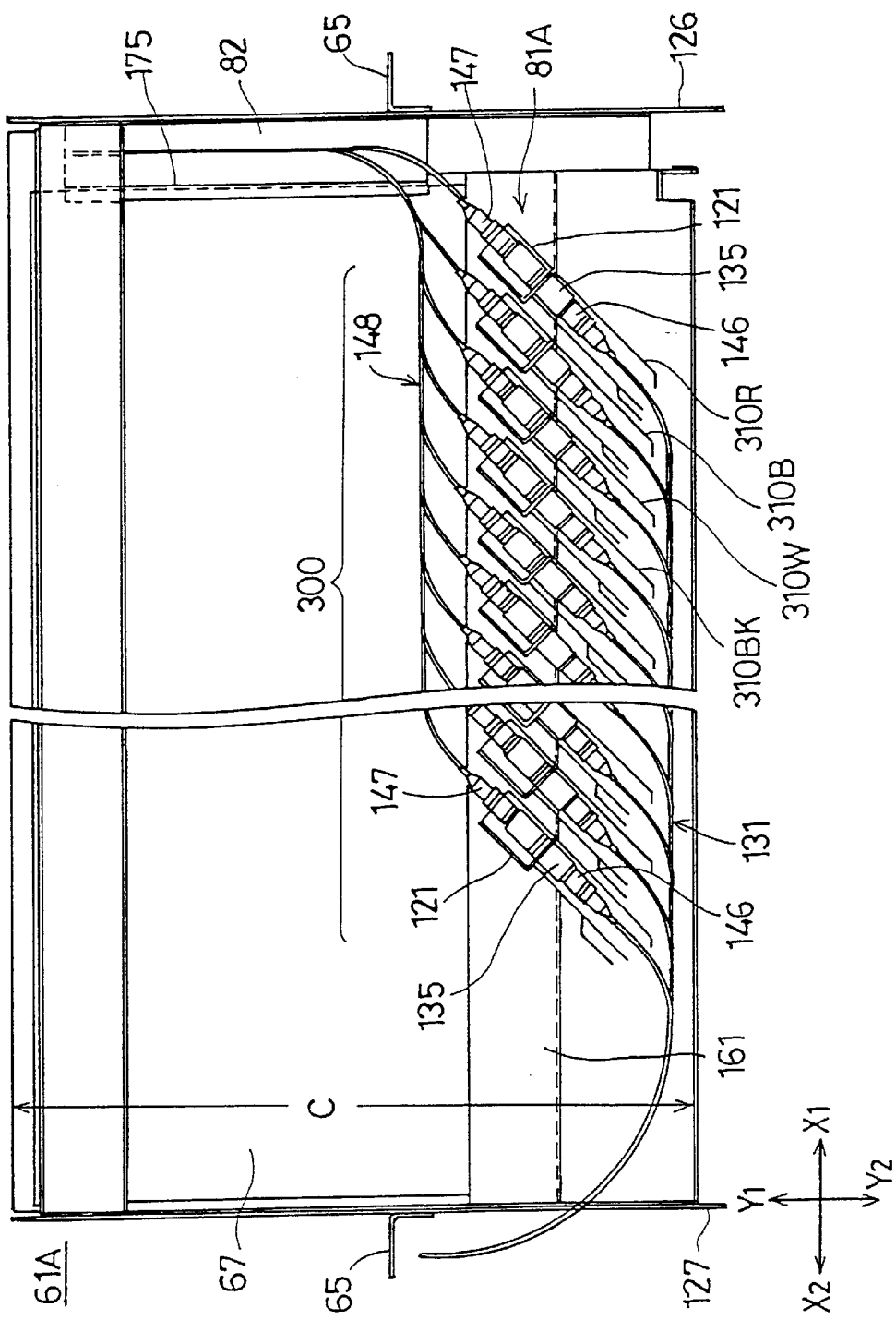
FIG. 21 is a plan view of the apparatus of FIG. 20.

FIG. 20 illustrates an optical multiplexing communication apparatus 61A of the second embodiment printed board units omitted. FIG. 21 is a top view of the optical multiplexing communication apparatus 61A. The optical multiplexing communication apparatus 61A is substantially the same as the optical multiplexing communication apparatus 61 shown in FIGS. 1A to 8, except for an optical connector adapting structure unit 300. In FIGS. 20 and 21, the same components as those in FIGS. 7 and 8 are indicated by the same reference numerals. Arrows X1 and X2 indicate the width direction of the optical multiplexing communication apparatus 61A, arrows Y1 and Y2 indicate the depth direction of the apparatus 61A, and arrows Z1 and Z2 indicate the vertical direction of the apparatus 61A.

Figure 24:
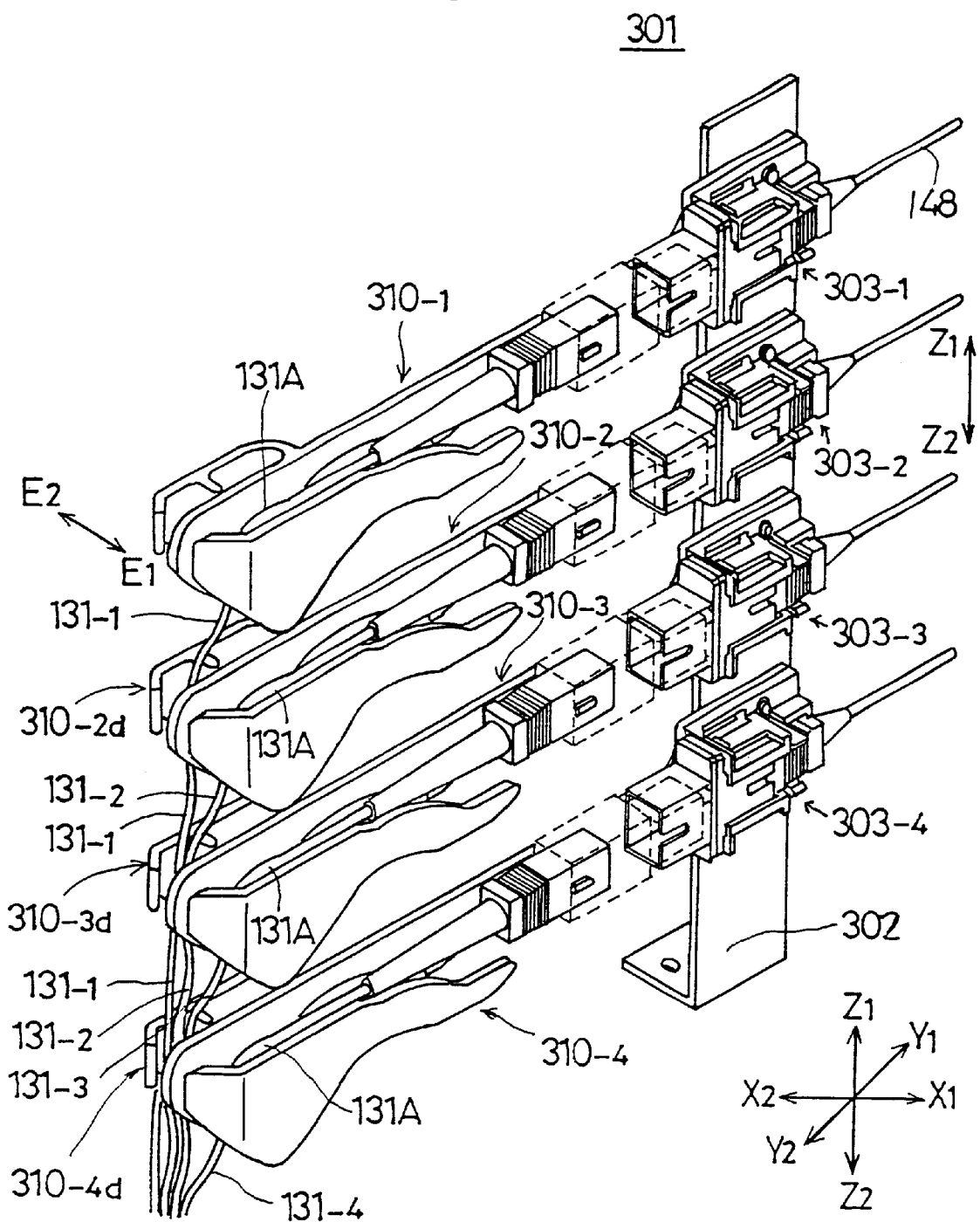
FIG. 24 illustrates an optical connector adapter set.
Figure 25:
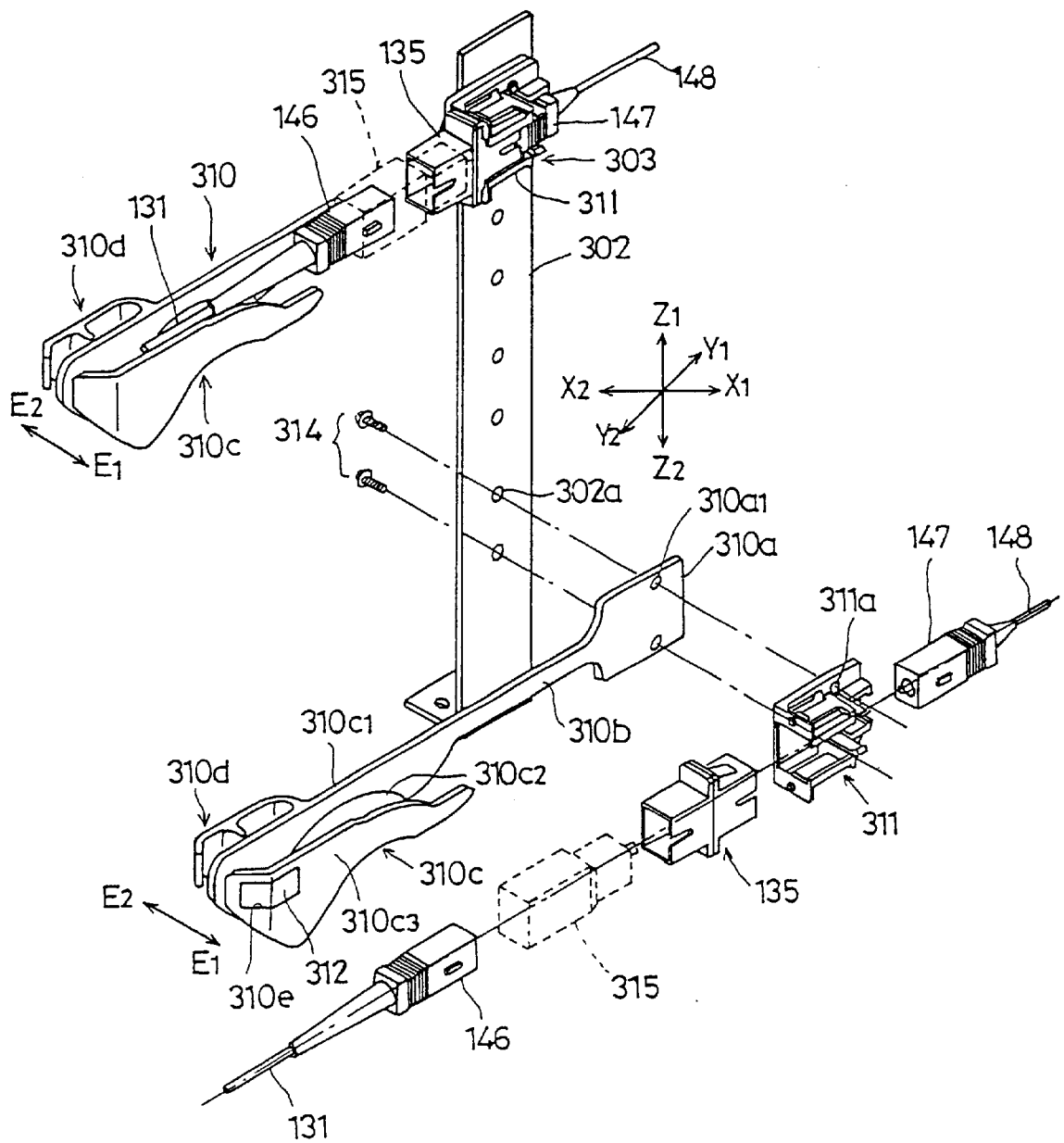
FIG. 25 illustrates an optical connector adapting device.

The optical connector adapting structure unit 300 is disposed adjacent the front surface of the uppermost portion of the optical multiplexing communication apparatus 61A. A large number of optical connector adapter sets 301 are arranged in the width direction of the optical multiplexing communication apparatus 61A. Each of the optical connector adapter sets 301 comprises four optical connector adapting devices 303 arranged vertically in line at uniform intervals and attached to an attachment pillar 302 (FIG. 24). The lower end of the attachment pillar 302 is screwed to the attachment board 161, and stands on the attachment board 161. Each of the optical connector adapting devices 303 comprises an optical fiber shaping member 310, an optical adapter holder 311, and an optical connector adapter 135, as shown in FIG. 25. In the optical connector adapting structure unit 300, a large number of sets of optical fiber shaping members 310 are arranged in the width direction of the optical multiplexing communication apparatus 61A, and each set of optical fiber shaping members 310 comprises four optical fiber shaping members 310 arranged in the vertical direction of the optical multiplexing communication apparatus 61A.

In each of the optical connector adapter sets 301, each optical fiber shaping portion 310c of the optical fiber shaping members 310 is arranged in the mid direction between the Y2 direction and X2 direction (angled at Θ (45 degrees) from the Y1–Y2 line). Accordingly, a length B of the optical connector adapting structure unit 300 in the Y1–Y2 directions is considerably shorter than in the prior art, so is a length C of the optical multiplexing communication apparatus 61A in the depth direction (Y1–Y2).

Figure 26A:
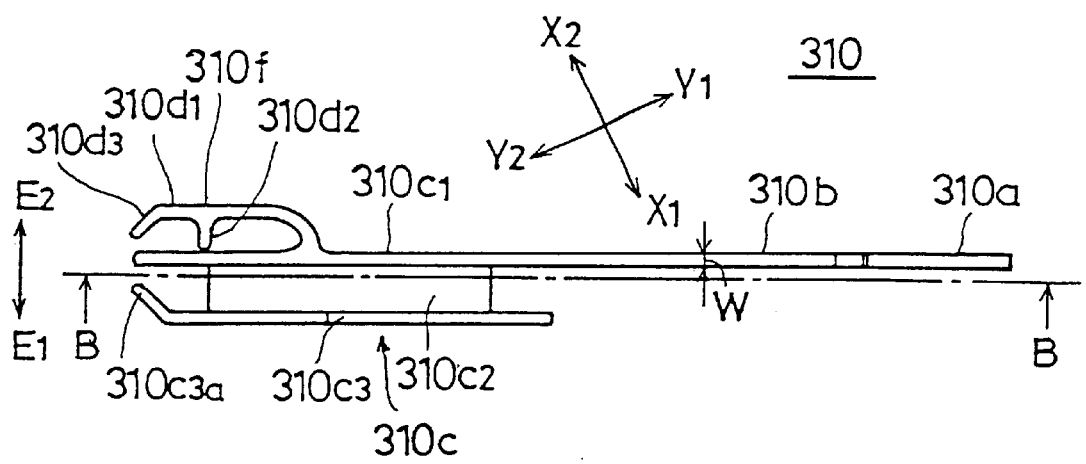
FIGS. 26A to 26C illustrate an optical fiber shaping member.
Figure 26B:
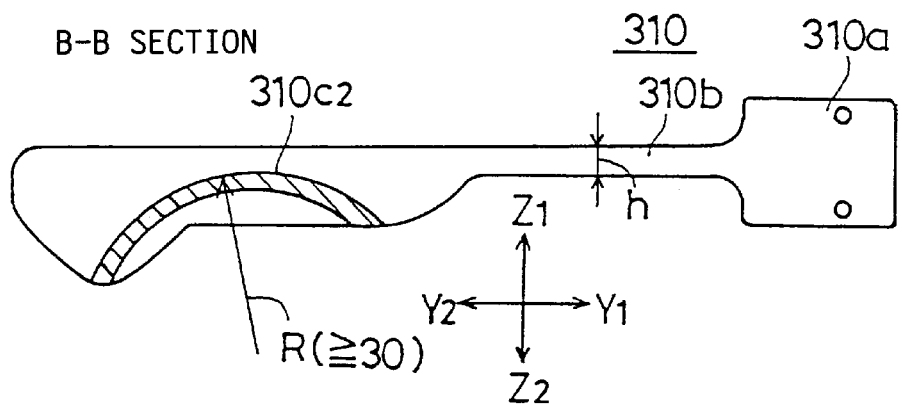
Figure 26C:
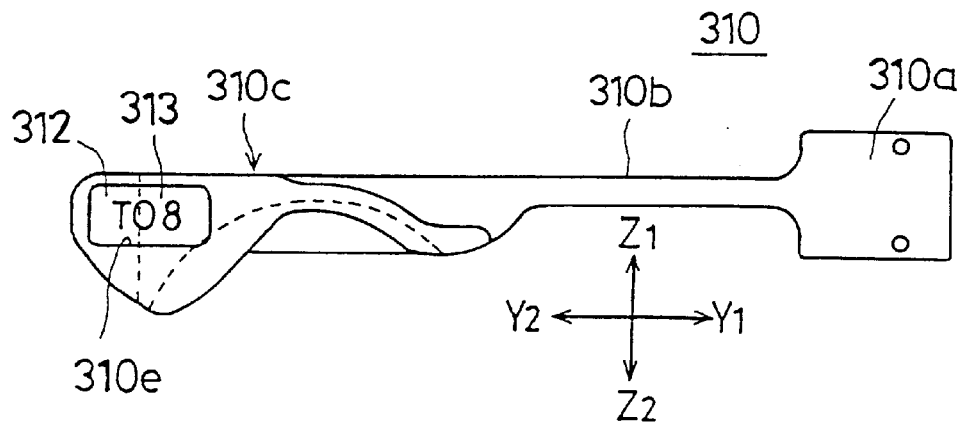

Each optical fiber shaping member 310 is molded from ABS resin. As shown in FIGS. 26A to 26C, a rectangular attachment portion 310a is attached at one end of each optical fiber shaping member 310. An arm portion 310b extends from, and generally in alignment with, the attachment portion 310a. An optical fiber shaping portion 310c, an optical fiber guide portion 310d, and a connection destination indicating label portion 310e are provided at the other end of the arm portion 310b. The optical fiber shaping members 310 are made in different colors such as red, blue, white, and black.

Each optical fiber shaping portion 310c comprises an inner flange portion 310c1 extending from the arm portion 310b, an arcuate portion 310c2 which protrudes from the X1-side surface of the inner flange portion 310c1 and arches in the Z1 direction at a predetermined bend radius R which is larger than the minimum tolerable bend radius (30 mm) for the optical fibers, and an outer flange portion 310c3 formed on the X1 side of the arcuate portion 310c2. In short, each optical fiber shaping portion 310c arches in the Z1 direction, and the flange portions 310c 1 and 310c3 are provided on both sides of each optical fiber shaping portion 310c.

Each connection destination indicating label portion 310e is a very shallow concave formed in a position close to the Y2-side of the X1-side surface of the outer flange portion 310c3. A connection destination indicating label 312 for indicating the destination optical fiber is attached to each connection destination indicating label portion 310e. Since the position of the connection destination indicating label portion 310e is closer to the Y2 side on the X1-side surface of the outer flange portion 310c3, a large area is secured for the connection destination indicating label portion 310e. Accordingly, each connection destination indicating label 312 is large in size, and characters 313 for indicating the connection destination can be made large and easy to read.

The Y2-side end of the outer flange portion 310c3 is bent in the X2 direction to form a stopper portion 310c3a for preventing the optical fiber from slipping out. The stopper portion 310c3a stops the optical fiber that has been shaped at the optical fiber shaping portion 310c and is heading in the Z2 direction.

Each optical fiber guide portion 310d is formed by the inner flange portion 310c1 and an arm portion 310d1. The arm portion 310d1 protrudes from the X2-side surface of the inner flange portion 310c1, and extends in parallel with the inner flange portion 310c1 in the Y2 direction. In the mid section of the arm portion 310d1 has a rib portion 310d 2. The Y2-direction end of the arm portion 310d1 is bent in the X1 direction to form a stopper portion 310d3 for preventing the optical fiber from slipping out. The arm portion 310d1 is also provided with a connection destination indicating label portion 310f on its outer surface.

The arm portion 310b is 2 mm in width, 5 mm in height, and the relationship between the width w and the height h is: h>w. The arm portion 310b exhibits rigidity in the vertical direction, while having elasticity in the width direction because of the elasticity of the ABS resin.

As shown in FIG. 25, each optical connector adapter 135 is screwed to the optical adapter holder 311. Each optical fiber shaping member 310 is screwed to the attachment pillar 302 in the following manner. That is, the corresponding optical adapter holder 311 is placed on the attachment portion 310a of the optical fiber shaping member 310. Screws 314 penetrate through holes 302a of the attachment pillar 302 and the holes 310a1 of the attachment portion 310a. The screws 314 are screwed into a female screw portion 311a of the optical adapter holder 311, thereby securing the optical fiber shaping member 310, as well as the optical adapter holder 311, to the attachment pillar 302. The optical fiber shaping portion 310c and the optical fiber guide portion 310d situated between the Y2 direction and the X2 direction with the attachment pillar 302 as a base position. The optical fiber shaping portion 310c and the optical fiber guide portion 310d do not shift in the Z1–Z2 directions, but may slightly shift in E1–E2 directions due to elastic deformation of the arm portion 310b.

Each optical connector adapting device 303 connects each external optical fiber 131 to each corresponding internal optical fiber 148 in the following manner.

Figure 27:
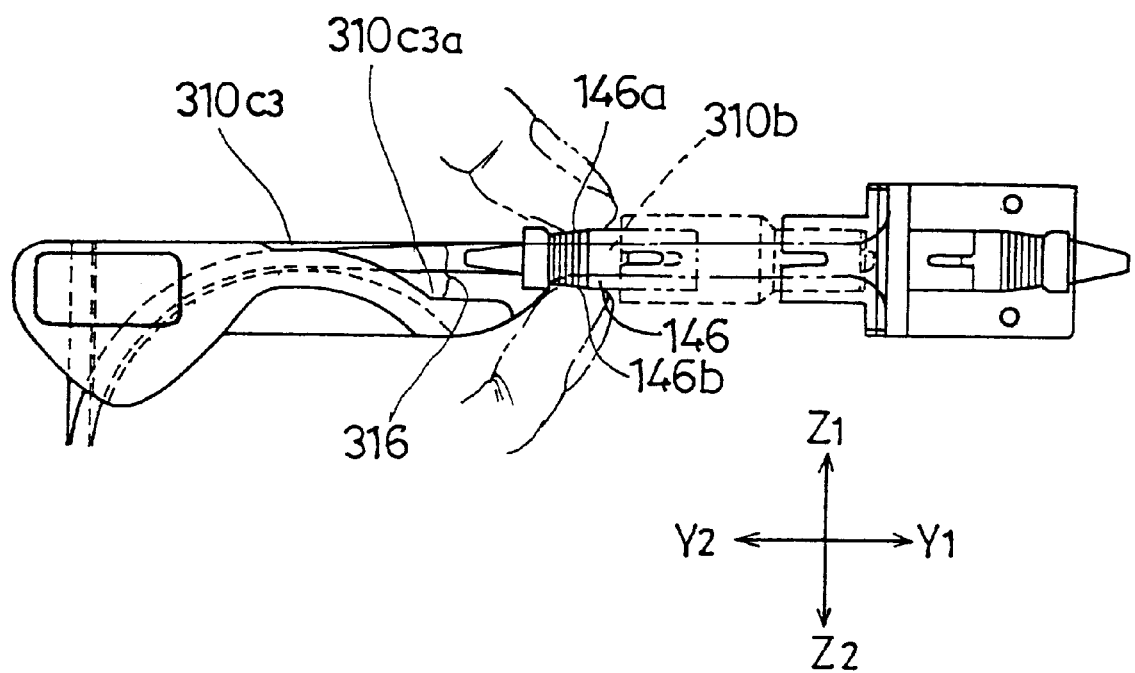
FIG. 27 illustrates the positional relationship between the optical connectors and the optical fiber shaping member.

Prior to the connection of the external optical fiber 131, the optical connector 147 at the edge of the internal optical fiber 148 is connected to the optical adapter holder 311 of the optical connector adapting device 303 on the Y1 side. Connecting the external optical fiber 131 to the internal optical fiber 148 is carried out on the from side of the optical multiplexing communication apparatus 61A. If necessary, a fixed attenuator 315 is first connected to the optical adapter holder 311. The optical connector 146 of the external optical fiber 131 is then connected to the optical adapter holder 311. As shown in FIG. 27, the optical connector 146 is situated at a height corresponding to the arm portion 310b. The upper surface 146a of the optical connector 146 is situated in a position higher than the upper end of the arm portion 310b, while the lower surface 146b of the optical connector 146 is situated in a position lower than the lower end of the arm portion 310b. Accordingly, an operator can pinch the optical connector 146 with fingers, as indicated by a two-dot chain line in the figure. A concave (or recess) portion 310c3a extending in the Z2 direction is formed on the Z1 side of the Y1-side end of the outer flange portion 310c3. The concave portion 310c3a constitutes a space 316 which accommodates the optical connector 146 shifted in he Y2 direction. Thus, connecting the optical connector 146 to the optical adapter holder 311 and pulling the optical connector 146 out of the optical adapter holder 311 can be smoothly carried out.

Figure 22:
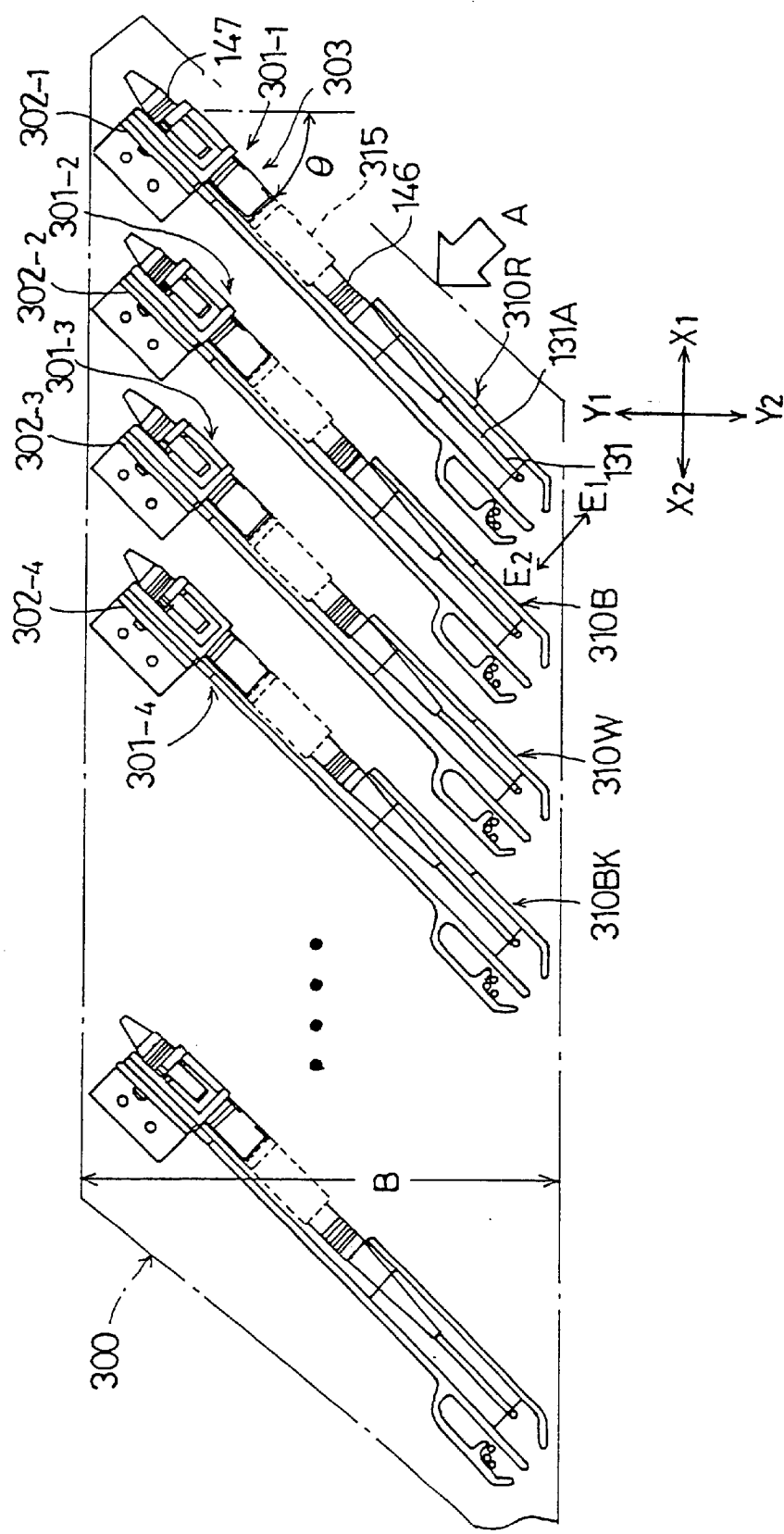
FIG. 22 illustrates the optical connector adapting structure unit of the apparatus of FIG. 21.

As shown in FIG. 24, four of the optical fiber shaping members 310 are attached to each attachment pillar 302. In FIG. 22, a red optical fiber shaping member 310R is attached to a first attachment pillar 302-1 from the X1-side end. A blue optical fiber shaping member 310B is attached to a second attachment pillar 302-2 from the X1-side end. A white optical fiber shaping member 310W is attached to a third attachment pillar 302-3 from the X1-side end. A black optical fiber shaping member 310BK is attached to a fourth attachment pillar 302-4 from the X1-side end. Each connection destination indicating label 312 indicating the connection destination of each corresponding external optical fiber 131 is attached to the connection destination indicating label portion 310e of each of the optical fiber shaping members 310R, 310B, 310W, and 310BK. The optical fiber shaping members are diagonally disposed in the top view, so that all the connection destination indicating labels 312 can be seen from the side of an arrow A of FIG. 22. The connection destination indicating labels 312 and the connection destination indicating characters are both large enough for easy recognition. An operator can recognize the connection destinations of the external optical fibers 131 according to the colors of the optical fiber shaping members 310. Also, an operator can easily recognize the connection destinations of the respective external optical fibers 131. Thus, wrong connections of the external optical fibers 131 can be prevented.

Figure 23:
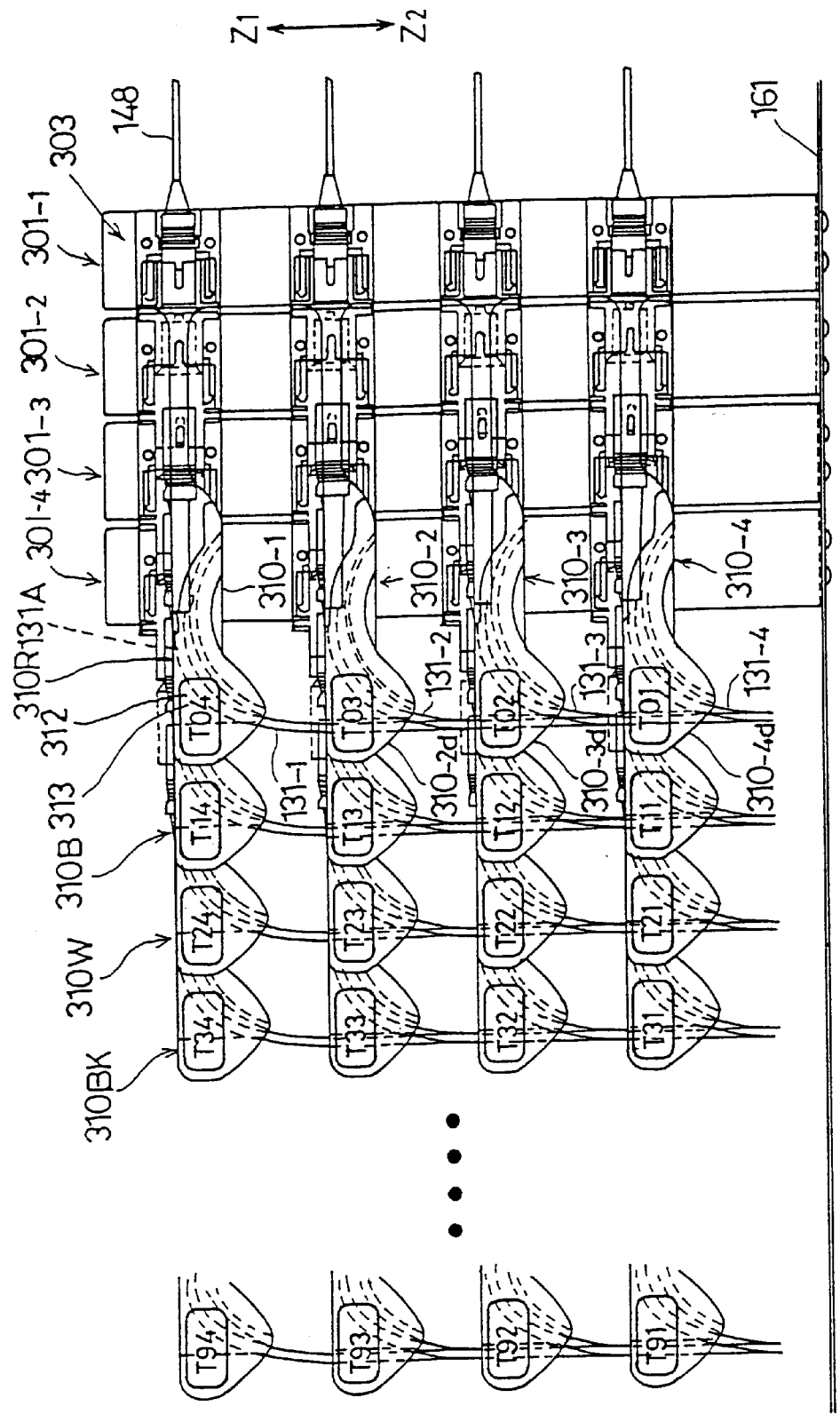
FIG. 23 illustrates the optical connector adapting structure unit seen from a direction of an arrow A of FIG. 22.

Each of the external optical fibers 131 extending from the connected corresponding optical connector 146 extends along the corresponding arm portion 310b, and enters the corresponding optical fiber shaping portion 310c, as shown in FIGS. 22 to 24. The external optical fiber 131 passes between the inner flange portion 310c1 and the outer flange portion 310c3, and extends along the arcuate portion 310c2 in the Z2 direction. The external optical fiber 131 is not necessarily in close contact with the arcuate portion 310c2. There will be no problem even if the external optical fiber 131 is situated slightly away from the arcuate portion 310c2. In the figures, reference numeral 131A indicates the shaped portion of each of the external optical fibers 131.

Even if the external optical fibers 131 are pulled in the Z2 direction, the respective arcuate portions 310c2 receive the external optical fibers 131 so as to prevent the bend radius of each of the external optical fibers 131 from becoming smaller than the minimum bend radius R. Movement of the shaped portion 131A of each of the external optical fibers 131 is restricted by each corresponding inner flange portion 310c1 and outer flange portion 310c3, so as to prevent the shaped portion 131A from shifting in the E1–E2 directions. Also, the stopper portion 310c3a prevents the external optical fiber 131 extending in the Z2 direction from slipping out of the optical fiber shaping portion 310c.

As shown in FIGS. 23 and 24, the external optical fiber 131-1 extending in the Z2 direction from the optical fiber shaping member 310-1 of an optical connector adapting device 303-1 in the uppermost position is introduced into the optical fiber guide portion 310-2d of the optical fiber shaping member 310-2 of the second highest optical connector adapting device 303-2. The external optical fiber 131-2 extending in the Z2 direction from the optical fiber shaping member 310-2 of the optical connector adapter device 303-2 and the external optical fiber 131-1 extending in the Z2 direction from the optical fiber guide portion 310-2d are introduced into the optical fiber guide portion 310-3d of the optical fiber shaping member 310-3 of the third highest optical connector adapting device 303-3. The external optical fiber 131-3 extending in the Z2 direction from the optical fiber shaping member 310-3 of the optical connector adapting device 303-3 and the external optical fibers 131-1 and 131-2 extending in the Z2 direction from the optical fiber guide portion 310-3d are introduced into the optical fiber guide portion 310-4d of the optical fiber shaping member 310-4 of the optical connector adapting device 303-4 in the lowermost position. In short, the shaped external optical fiber 131-1 is held and guided by the optical fiber guide portions 310-2d, 310-3d, and 310-4d; the shaped external optical fiber 131-2 is held and guided by the optical fiber guide portions 310-3d and 310-4d; and the shaped external optical fiber 131-3 is held and guided by the optical fiber guide 310-4d. Thus, the external optical fibers 131-1 to 131-3 extending in the Z2 direction after the shaping can be neatly kept. The external optical fibers 131-1 to 131-4 coming out of the optical fiber guide 310-4d extend in the X2 direction along the uppermost portion of the optical multiplexing communication apparatus 61A.

Each optical fiber shaping portion 310c is loaded with the load of each corresponding external optical fiber 131 in the Z2 direction. However, since the arm portion 310b has high rigidity in the Z1–Z2 directions, the optical fiber shaping portion 310c never sags down.

Passing each external optical fiber 131 through each corresponding optical fiber shaping portion 310c and the optical fiber guide portion 310d is carried out by hand in a restricted space. Here, each of the optical fiber shaping portions 310c and each of the optical fiber guide portions 310d can slightly shift in the transverse direction by virtue of the elasticity of each corresponding arm portion 310b. When passing one of the external optical fibers 131 through the corresponding optical fiber shaping portion 310c and the optical fiber guide portion 310d, the adjacent optical fiber shaping members can be bent by the hand of the operator to maintain enough space for the operation. Thus, the passing through of the external optical fiber 131 can be smoothly carried out, without damaging the external optical fiber 131. Likewise, removing the external optical fiber 131 from the corresponding optical fiber shaping portion 310c and the optical fiber guide portion 310d can be smoothly carried out, without damaging the external optical fiber 131.

Figure 28:
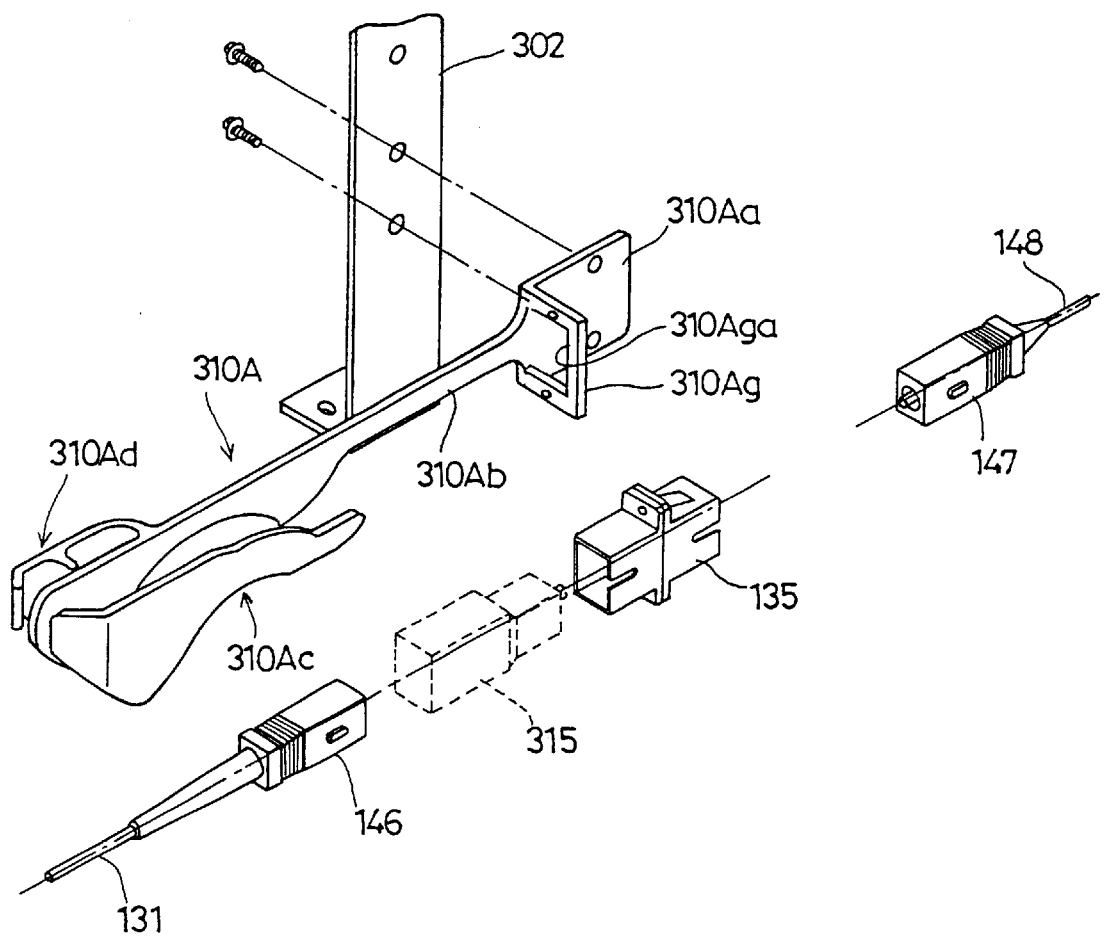
FIG. 28 illustrates a modification of the optical fiber shaping member.

FIG. 28 shows a modification of an optical fiber shaping member. This optical fiber shaping member 310A is the same as the optical fiber shaping member 310 of FIG. 25, except that an optical adapter flange portion 310Ag is formed at the Y2-side end of the attachment portion 310a. The optical adapter flange portion 310Ag is used for attaching an optical connector adapter 135, and has a rectangular opening 310Aga.

The optical connector adapter 135 is engaged with the opening 310Aga, and is screwed to the optical fiber shaping member 310A. In this structure, the optical adapter holder 311 shown in FIG. 25 is unnecessary.

The present invention is not limited to the specifically disclosed embodiments, but variations and modifications may be made without departing from the scope of the present invention.

The present application is based on Japanese priority application Nos. 10-247384 and 11-206820, filed on Sep. 1, 1998, and Jul. 21, 1999, respectively, the entire contents of which are hereby incorporated by reference.

What is claimed is:

1. An electronic apparatus, comprising:
   an optical connector adapting unit adjacent a front surface of the electronic apparatus and including a plurality of optical connector adapters, to which optical connectors of external optical fibers are detachably connectable;
   each optical connector adapter being arranged adjacent a front surface of the electronic apparatus and supported in a diagonal direction relatively to the front surface of the electronic apparatus; and
   each optical connector being attachable to and detachable from an associated optical connector adapter in the diagonal direction.

2. The electronic apparatus as claimed in claim 1, wherein optical connectors are detachably connectable to each of opposite ends of each optical connector adapter.

3. An electronic apparatus, comprising:
   an optical connector adapting unit including a plurality of optical connector adapters, to which optical connectors of external optical fibers are detachably connectable;

each optical connector adapter being disposed adjacent a front surface of the electronic apparatus and supported in a diagonal direction relatively to the front surface of the apparatus; and an air guide disposed adjacent a rear surface of the optical connector adapting unit, guiding air from a lower portion of the apparatus and toward the rear surface of the electronic apparatus; and the optical connectors being diagonally attachable to and detachable from an associated optical connector adapter in the diagonal direction.

4. The electronic apparatus as claimed in claim 3, wherein optical connectors are detachably connected at both ends of each of the optical connector adapters.

5. The electronic apparatus as claimed in claim 3, further comprising:

an internal optical connector passage, formed at a side end of the air guide, communicating with the optical connector adapting unit and extending perpendicularly to the front surface of the apparatus.

6. The electronic apparatus as claimed in claim 5, wherein internal optical fibers to be connected to the optical connector adapters are connected to the rear surface of the apparatus via the internal optical connector passage.

7. The electronic apparatus as claimed in claim 3, wherein the air guide is detachable from the rear surface of the apparatus.

8. An electronic apparatus, comprising:

an optical connector adapting unit adjacent a front surface of the electronic apparatus and including a plurality of optical connector adapters arranged adjacent a front surface of the electronic apparatus and supported in a diagonal direction relatively to the front surface of the electronic apparatus, and to which optical connectors of external optical fibers are connectable in the diagonal direction; and optical fiber shaping members, each member comprising:
an attachment portion on a first end of the member,
an arm portion connected at a first thereof to, and extending from, the attachment portion, and
an optical fiber shaping portion, arching in a vertical direction relatively to the electronic apparatus and having a first end extending from a second, opposite end of the arm portion, and which guides an optical fiber at a bend radius larger than a minimum tolerable bend radius for an optical fiber, each of the optical fiber shaping members being attached to a corresponding optical connector adapter through the attachment portion, and being diagonally disposed relatively to the front surface of the apparatus;

the optical connectors being attachable to and detachable from the optical connector adapters in the diagonal direction; and the respective optical fiber, extending from each optical connector which is connected to the corresponding optical connector adapter, being shaped in a corresponding said optical fiber shaping portion.

9. The electronic apparatus as claimed in claim 8, wherein the arm portion of each of the optical fiber shaping members has rigidity in the vertical direction and elasticity in a direction transverse to the vertical direction.

10. The electronic apparatus as claimed in claim 8, wherein each of the optical fiber shaping members further comprises an optical fiber holding portion, extending from a second, opposite end of the shaping portion which holds the optical fiber so as to extend in a vertical direction.

11. The electronic apparatus as claimed in claim 10, wherein each optical fiber shaping member further comprises a connection destination indicating portion, at the other end thereof, which indicates a connection destination of a corresponding outer optical fiber.

12. The electronic apparatus as claimed in claim 8, wherein the optical fiber shaping members have respective, different colors depending on connection destinations of the respective optical fibers shaped thereby.

13. An optical fiber shaping member, comprising:

an attachment portion at one end of the optical fiber shaping member;

an arm portion extending from and aligned with the attachment portion; and an optical fiber shaping portion having a first end aligned in a first common direction with, and extending from, the arm portion to an opposite, second end of the shaping portion, the shaping portion arching in a direction transverse to the first common direction of alignment and which guides and shapes a portion of an optical fiber, received therein, at a bend radius larger than a minimum tolerable bend radius for optical fibers.

14. The optical fiber shaping member as claimed in claim 13, wherein the attachment portion has an optical adapter flange portion to which an optical connector adapter is attached.

15. The optical fiber shaping member as claimed in claim 1, wherein the electronic apparatus includes a side wall perpendicular to the front surface, and each optical connector adapter is supported in a diagonal direction relatively to the side wall surface of the electronic apparatus.

16. An electronic apparatus as recited in claim 2, further comprising plural internal optical fibers having respective optical connectors attachable to and detachable from respective optical connector adapters in the diagonal direction.

* * * * *